(12) United States Patent
Tanuma et al.

(10) Patent No.: US 6,373,513 B1
(45) Date of Patent: Apr. 16, 2002

(54) PRINTER HAVING PRINT DATA CORRECTION CIRCUIT

(75) Inventors: Jiro Tanuma; Katsuyuki Ito; Shinichi Katakura; Akira Nagumo, all of Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 08/427,812

(22) Filed: Apr. 26, 1995

Related U.S. Application Data

(62) Division of application No. 07/907,484, filed on Jul. 1, 1992, now abandoned.

(30) Foreign Application Priority Data

Jul. 5, 1991 (JP) ............................................. 3-165873

(51) Int. Cl.[7] ............................ B41J 2/435; H04N 1/23
(52) U.S. Cl. ..................... 347/240; 358/1.9; 358/298
(58) Field of Search ................................ 347/237, 240, 347/131; 358/296, 458, 1.8, 1.9; 382/288, 266, 269

(56) References Cited

U.S. PATENT DOCUMENTS

| | | | |
|---|---|---|---|
| 4,398,256 A | * | 8/1983 | Nussmeier et al. ......... 382/266 |
| 4,437,122 A | | 3/1984 | Walsh et al. |
| 4,703,323 A | | 10/1987 | Troupes et al. |
| 4,837,587 A | * | 6/1989 | Ng .......................... 358/296 X |
| 4,843,408 A | | 6/1989 | Tanaka |
| 5,025,322 A | | 6/1991 | Ng |
| 5,050,227 A | * | 9/1991 | Furusawa et al. .............. 382/54 |
| 5,130,821 A | * | 7/1992 | Ng ......................... 358/458 X |
| 5,134,495 A | | 7/1992 | Frazier et al. |
| 5,193,008 A | | 3/1993 | Frazier et al. |

FOREIGN PATENT DOCUMENTS

| | | |
|---|---|---|
| EP | 0 132 415 | 1/1985 |
| EP | 416886 A2 | 3/1991 |

* cited by examiner

*Primary Examiner*—David F. Yockey
(74) *Attorney, Agent, or Firm*—Venable; Michael A. Sartori

(57) ABSTRACT

A non-impact printer has a print data correction circuit for providing a print data correction processing for video signals transmitted from a printing control unit to produce correction output data or patterns for printing on basic raster lines and other correction output data or patterns for printing on sub-raster lines. Those correction output data or patterns are supplied to the print head in the form of a real printing data signal.

18 Claims, 23 Drawing Sheets

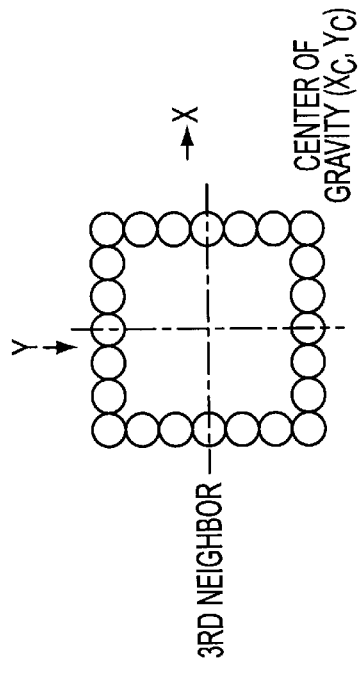
FIG. 16A
FIG. 16B
FIG. 16C
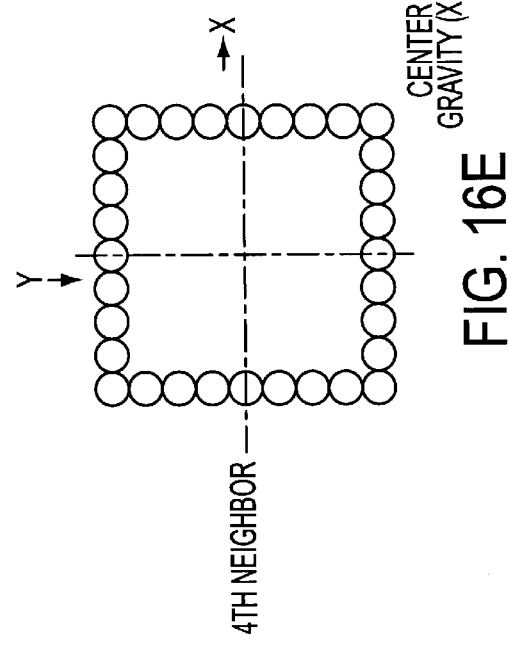
FIG. 16D
FIG. 16E

Fig. 19

| CONDITION | OUTPUT PATTERN | CONDITION | OUTPUT PATTERN |
|---|---|---|---|
| $X < -0.4$<br>$Y < -0.2$ | | $-0.4 \leq X < -0.2$<br>$0 \leq Y < 0.2$ | |
| $X < -0.4$<br>$-0.2 \leq Y < 0.2$ | | $-0.45 \leq X < -0.2$<br>$0.2 \leq Y < 0.45$ | |
| $X < -0.4$<br>$0.2 \leq Y < 0.45$ | | $-0.4 \leq X < -0.2$<br>$0.45 \leq Y$ | |
| $X < -0.4$<br>$0.45 \leq Y < 0.7$ | | $-0.2 \leq X < 0.2$<br>$Y < -0.2$ | |
| $X < -0.4$<br>$0.7 \leq Y$ | | $-0.2 \leq X < 0.2$<br>$-0.2 \leq Y < 0.2$ | |
| $0.4 \leq X < -0.2$<br>$Y < 0$ | | $-0.2 \leq X < 0.2$<br>$0.2 \leq Y < 0.45$ | |

Fig. 20
| CONDITION | OUTPUT PATTERN | CONDITION | OUTPUT PATTERN |
|---|---|---|---|
| −0.2≤X<0.2<br><br>0.45 ≤ Y | 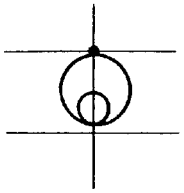 | 0.45 ≤ X<br><br>−0.2≤Y<0.2 | 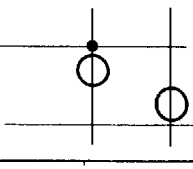 |
| 0.2≤X<0.4<br><br>Y < 0 | 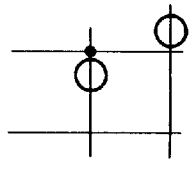 | 0.45 ≤ X<br><br>0.2≤Y<0.45 | 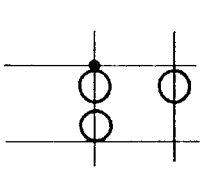 |
| 0.2≤X<0.4<br><br>0≤Y<0.2 | 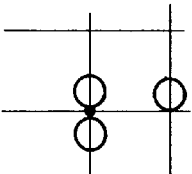 | 0.45 ≤ X<br><br>0.45≤Y<0.7 | 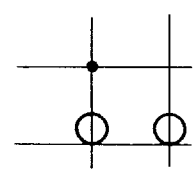 |
| 0.2≤X<0.4<br><br>0.2≤Y<0.45 | 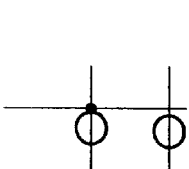 | 0.45 ≤ X<br><br>0.7 ≤ Y | 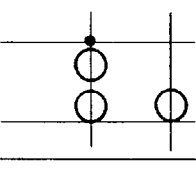 |
| 0.2≤X<0.4<br><br>0.45 ≤ Y | 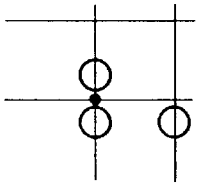 | | |
| 0.45 ≤ X<br><br>Y ≤ −0.2 | 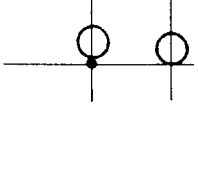 | | |

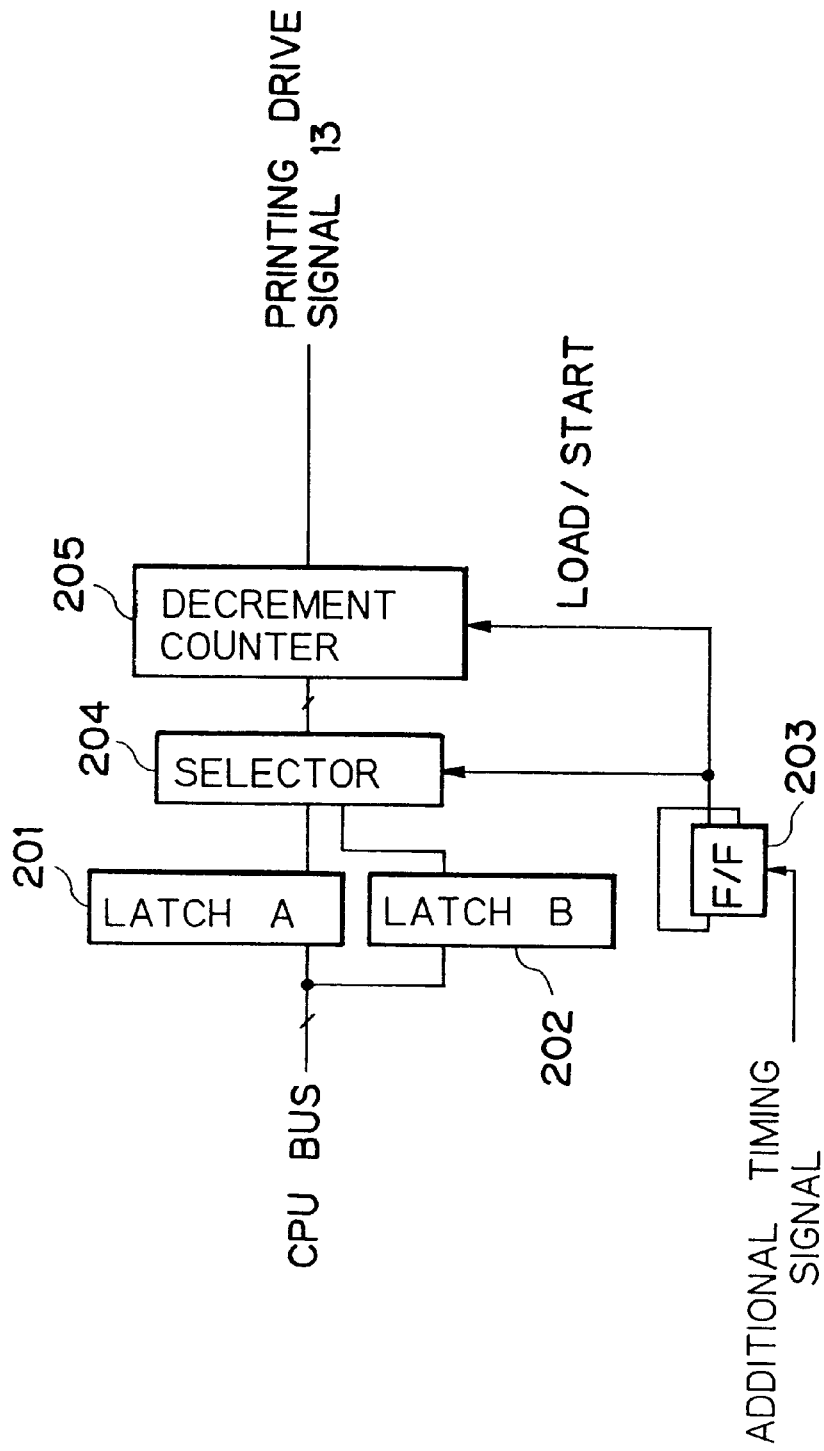

PRINTER HAVING PRINT DATA CORRECTION CIRCUIT

This is a Division of application Ser. No. 07/907,484 filed Jul. 1, 1992, now abandoned hereby incorporated by reference.

BACKGROUND OF THE INVENTION

1. Field of the Invention

The present invention relates to a non-impact printer, and more particularly to a printer improved in printing quality to provide a natural printing image for a curve, a slash or the like.

2. Description of the Prior Art

Hitherto, in a non-impact printer such as an electrophotographic printer, an electrically charged photoconductor drum is illuminated with a light source to form an electrostatic latent image on a surface thereof, a developing is performed upon adhesion of a toner to the electrostatic latent image, to form a toner image, and then the thus obtained toner image is transferred to a recording material to be fixed thereon.

FIG. 2 is a block diagram of a printer control circuit for use in a conventional non-impact printer. In the figure, a printing control unit 1 transmits, at the time point that a sheet arrives at a printing ready point, a timing signal 12, including a line and a raster timing signal, to a host or another controller, and receives video data 11 which has been edited on each page in a host or another controller. The received video data 11 in the printing control unit 1 is transmitted to an LED (Light Emitting Diode) head 19 in the form of a real printing data signal 18. Upon receipt of a line of video data 11, the control unit 1 transmits a latch signal 17 to the LED head 19 so as to hold the real printing data signal 18 therein. Before receiving the subsequent data from a host or another controller, the thus held real printing data signal 18 is visualized in print when the print head 19 receives a printing drive signal 13. The real printing data signal 18 is transmitted to the LED head 19 in synchronism with a clock signal 18a.

Transmission and receipt operation of the video data 11 is performed in the unit of print lines. FIG. 3 is an operational time chart of the conventional non-impact printer as mentioned above.

However, according to the conventional non-impact printer as mentioned above, the printing is performed in accordance with image data or video data 11 transmitted from the host controller as it is, or depending on resolution of the LED head 19 which is determined by an arrangement of the LED devices at regular intervals in a raster direction. Thus, there will be retained a serrated edge-like image on a slash portion of the printed image due to the resolution.

SUMMARY OF THE INVENTION

It is therefore an object of the present invention, in view of the foregoing problems, to provide an improved printer.

It is another object of the present invention to provide a non-impact printer capable of printing with a resolution higher than that of video data received from another controller or a host controller.

It is still another object of the present invention to provide a non-impact printer capable of reducing a serrated edge-like image on a slash portion of the printed image, thereby improving a printing quality.

In accordance with a preferred embodiment of the present invention, there is disclosed a non-impact printer provided with control means for providing a sequence control for the printer in its entirety in response to a control signal and a video data from another controller, comprising: means for generating line timing signals for printing on basic raster lines, and additional line timing signals each for printing on a sub-raster line during an interval of basic raster lines; line buffer means adapted for storing the received video datas in units of lines at predetermined continuous-line correspondence; means responsive to the line timing signals for causing the video data to be sequentially stored in said line buffer means; logical operation circuit means for taking out the video data stored in said line buffer in units of columns, performing a logical operation for the obtained video data in accordance with function groups each previously defined, and outputting a first correction output data for printing on the basic raster line and at least one second correction output data for printing on the sub-raster line; and means for transmitting the first and second correction output data to a print head in the form of a real printing data signal in synchronism with the line timing signal and the additional line timing signal, respectively; wherein said control means includes means for setting a print head drive energy for printing on the basic raster lines and a print head drive energy for printing on the additional raster lines independently of each other.

In accordance with another preferred embodiment of the invention, there is disclosed a non-impact printer provided with control means for providing a sequence control for the printer in its entirety in response to a control signal and a video signal from another controller, comprising: means for generating line timing signals for printing on basic raster lines, and additional line timing signals each for printing on a sub-raster line during an interval of a receiving timing of the line timing signals; line buffer means adapted for storing the received video data in units of lines at predetermined continuous-line correspondence; means responsive to the line timing signals for causing the video data to be sequentially stored in said line buffer means; means for taking out the video data stored in said line buffer in units of dots, and performing a logical operation for location of the center of gravity of the peripheral dots in the center the obtained dot; and a table conversion logical operation circuit for converting location information obtained by the logical operation into the corresponding output patterns, and transmitting the thus obtained output patterns to a print head in the form of a real printing data signal in synchronism with the line timing signal and the additional line timing signal, respectively; wherein said control means includes means for setting a print head drive energy for printing on the basic raster lines and a print head drive energy for printing on the additional raster lines independently of each other.

BRIEF DESCRIPTION OF THE DRAWINGS

The objects and features of the present invention will become more apparent from a consideration of the following detailed description taken in conjunction with the accompanying drawings in which:

FIGS. 16A–16E schematically show the center dot to be inspected and the neighbors thereof;

FIG. 19 shows a first conversion table;

FIG. 20 shows a second conversion table;

FIG. 22 is a block diagram showing by way of example a drive energy setting circuit shown in FIGS. 1 and 12.

DESCRIPTION OF THE PREFERRED EMBODIMENTS

Figure 1:
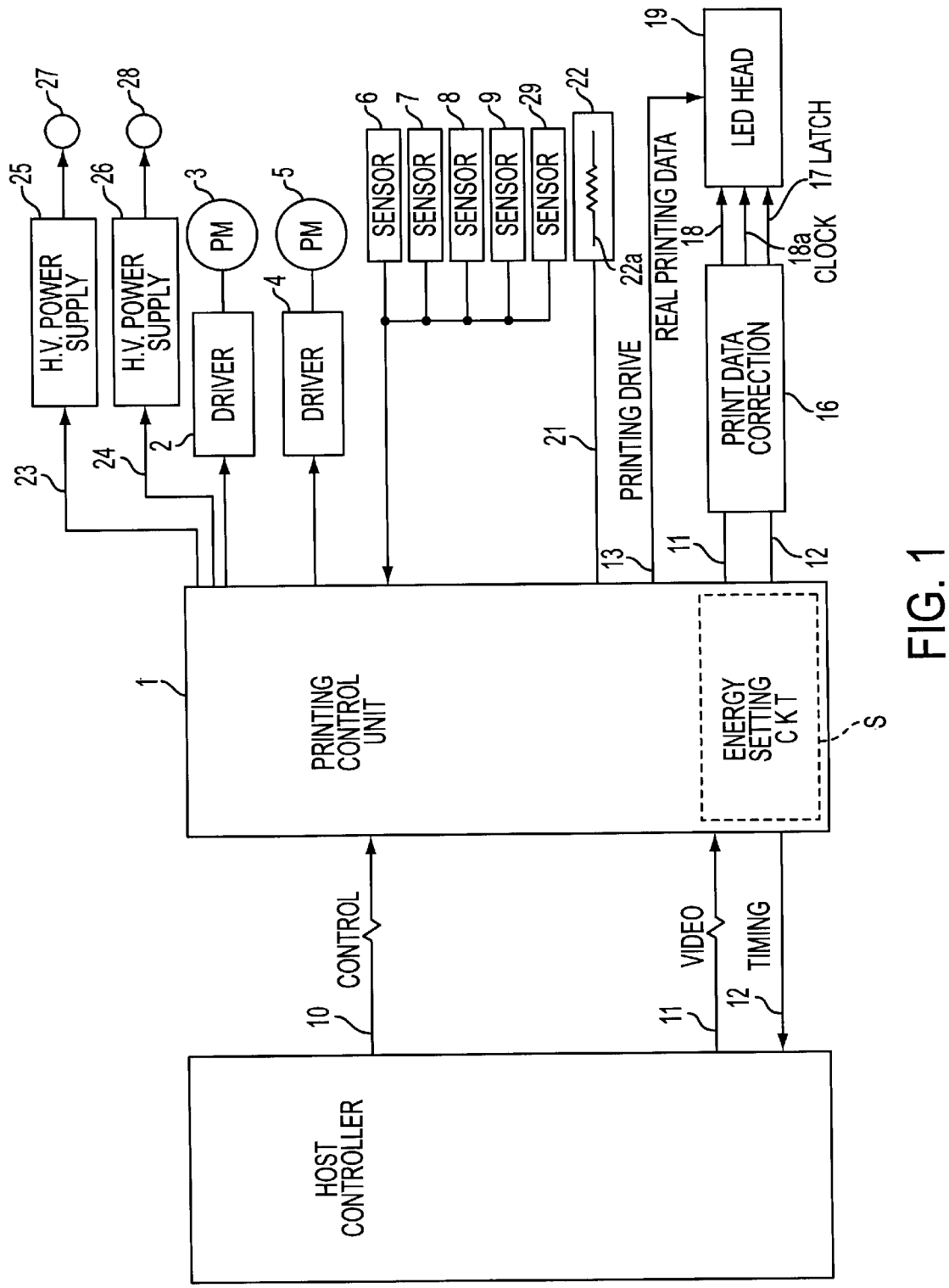
FIG. 1 is a schematic block diagram of a control circuit of a non-impact printer according to a preferred embodiment of the present invention.
Figure 2:
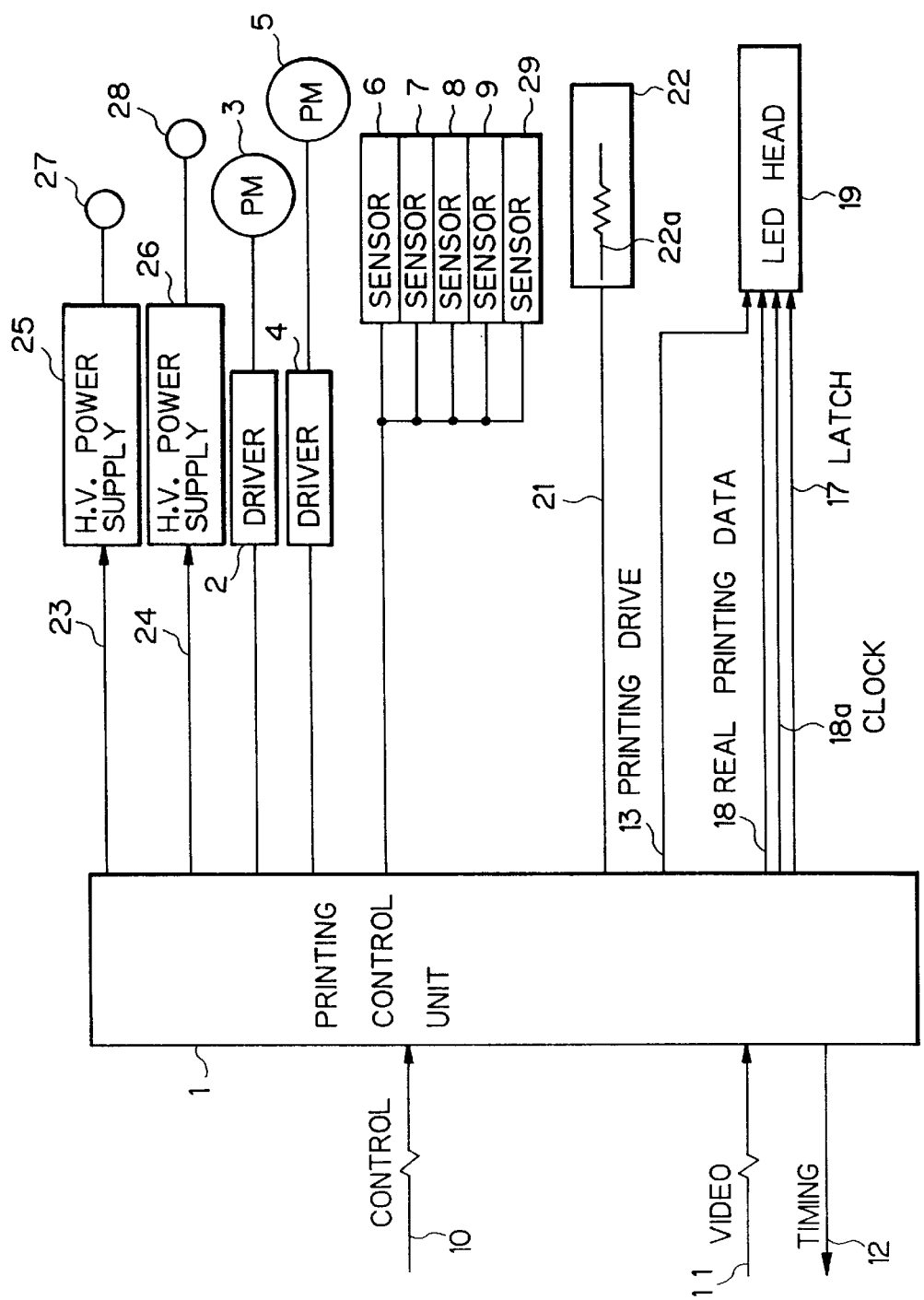
FIG. 2 is a schematic block diagram showing a printer unit control circuit of a conventional non-impact printer.
Figure 3:
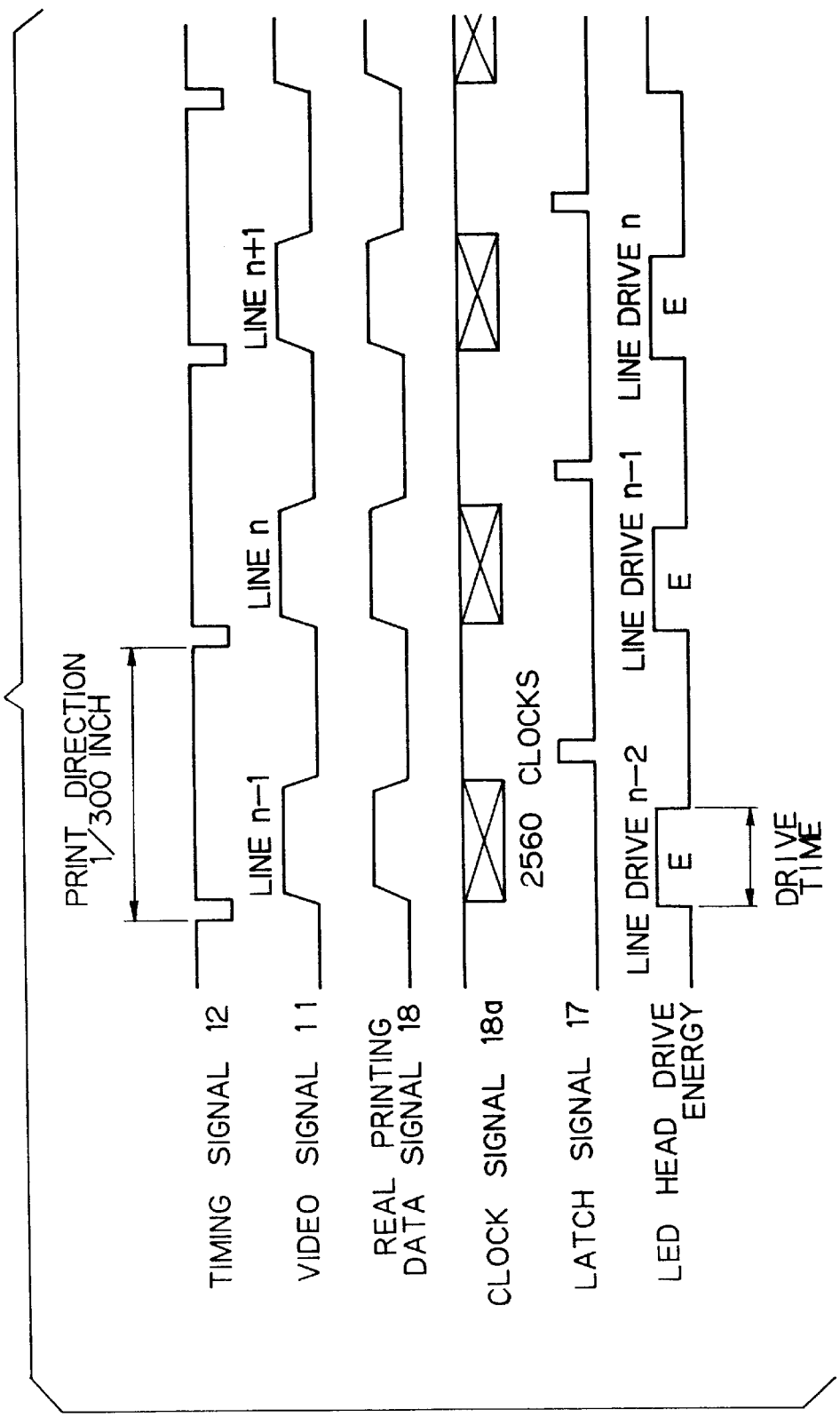
FIG. 3 is a time chart useful for understanding the conventional non-impact printer.

The preferred embodiments of a printer of the invention will be described with reference to the drawings in detail which include FIG. 1, a block diagram of a control circuit in a non-impact printer according to an embodiment of the present invention, and FIG. 4, a block diagram of a print data correction circuit included in the embodiment. In FIG. 1, a printing control unit or main control 1 comprises a microprocessor, a ROM, a RAM, input/output ports, a timer and similar components, in the embodiment, and is provided in the inside of a printing unit of a printer. The printing control unit 1 provides a sequence control for the printer in its entirety in response to control signals 10 and a video signal 11 from a host controller 100. Upon receipt of a print instruction included in the control signals 10, the printing control unit 1 first causes a fuser temperature sensor 29 to sense whether or not a fuser 22 including a heater 22a is in an appropriate temperature range, and if not, turns on the heater 22a in a timed manner with signal 21 to heat the fuser 22 up to an appropriate temperature. Next, a motor (PM) 3 for development/transfer process is driven through a driver 2 and simultaneously a high voltage power source 25 for charging is turned on in response to a charge trigger signal 23 to perform charging of a developing unit 27.

The sort of sheet set is determined on the basis of the results from a sheet remaining amount sensor 8 and a sheet size sensor 9 to start feeding sheets corresponding to the sort of sheet thus sensed. A motor 5 for sheet feed is able to rotate in a bilateral direction through a driver 4. The motor 5 first reversely rotates to carry the set sheet by a predetermined amount until a sheet inhalation inlet sensor 6 senses the sheet, and subsequently, regularly rotates to transfer the sheet to a printing device of the inside of the printer.

The printing control unit 1 transmits, at the time point that the sheet arrives at a printing ready point, a timing signal 12, including a line timing signal and a raster timing signal (receiving clock signal), to the other controller, not shown, and receives video data 11.

The print data correction circuit 16 will be described in detail, referring to FIG. 4, hereinafter. The print data correction circuit 16 comprises a one-line receiving buffer 31, a nine-line buffer 32, selectors 33 and 44, a bilateral buffer 34 having a bilateral selecting function, a receipt address circuit 35, a transmission address circuit 36, a timing signal generation circuit 37 adapted for generating receiving clock signals, transfer clock signals, line timing signals for printing on basic raster lines, and additional line timing signals each for printing on a sub-raster line during an interval of basic raster lines a logical operation circuit 42, a raster line counter 43 and latch circuits 51–59.

The video data 11, which has been edited in units of pages with the resolution of a standard 300 DPI (dot-per-inch) in a host or another controller or the host controller, is received by the printing control unit 1, and then supplied to the print data correction circuit 16. At that time, in the print data correction circuit 16, the timing signal generator 37 generates receiving clock signals A and transmits the same to the receipt address circuit 35. The entered video data 11 is stored in storage locations of the one-line receiving buffer 31, which are addressed by the receipt address circuit 35 whenever the receiving clock signal A is generated. Such storage of the video data 11 into the one-line receiving buffer 31 is carried out whenever the bilateral buffer 34 receives on a one-line (300 DPI) correspondence basis the video data 11 from a host or another controller.

The video data 11, which has been stored in the one-line receiving buffer 31, is transferred to the nine-line buffer 32 whenever the reception of a line of video data 11 is terminated, so that the nine-line buffer 32 stores nine lines of video data 11.

Figure 5:
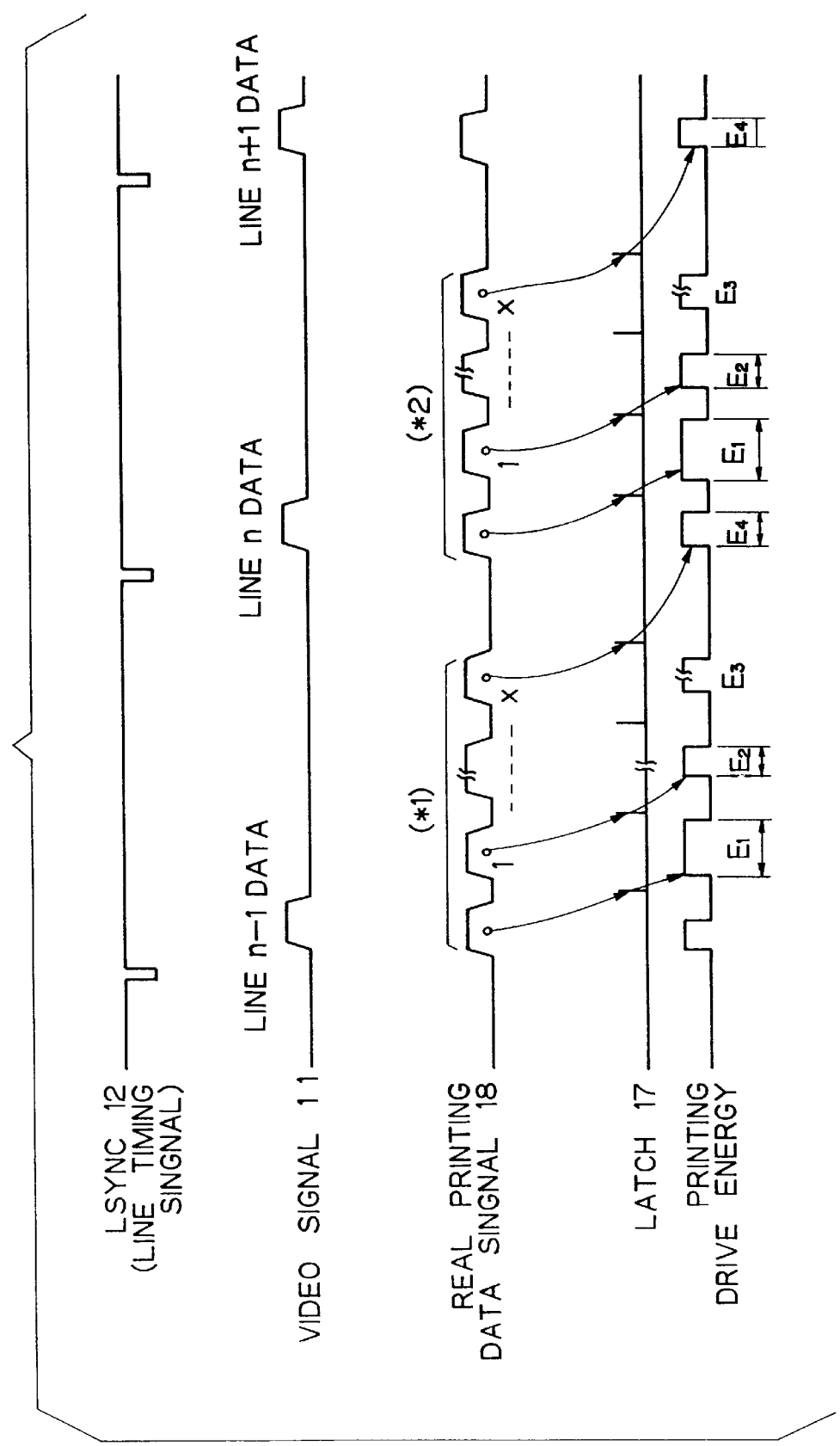
FIG. 5 is an operational time chart useful for understanding the printer unit control circuit according to the embodiment.

FIG. 5 shows timings of the printer unit control circuit, in which N denotes the number of line buffers in the print data correction circuit 16. In the figure, *1 denotes the {n−6}th line of data obtained by a logical operation with data from the {n−10}th line to {n−2}th line with the number of sub-raster lines being 3. Also, *2denotes the {n−5}th line of data obtained by a logical operation with data from the {n−9}th line to the {n−1}th line with the number of sub-raster lines being 3. In the figure, E1, E2, . . . , E4 denote driving periods of time in the case of printing of a dot on respective basic and sub-raster lines 1, 2, . . . , 4.

As seen from FIGS. 5 through 8B, the logical operation circuit 42 performs a logical operation on the basis of the video data 11 stored in the nine-line receiving buffer 32, prior to receipt of the subsequent video data 11 from a host or another controller, so as to obtain four real printing data signals 18 as correction output data. This contemplates to provide additional three sub-raster lines with 1,200 DPI pitch as well as a basic raster line. The thus obtained four real printing data signals 18 are transferred to an LED head or electrical-to-optical transducer 19 so that printing is performed with a 1,200 DPI pitch in a printing direction.

Figure 4:
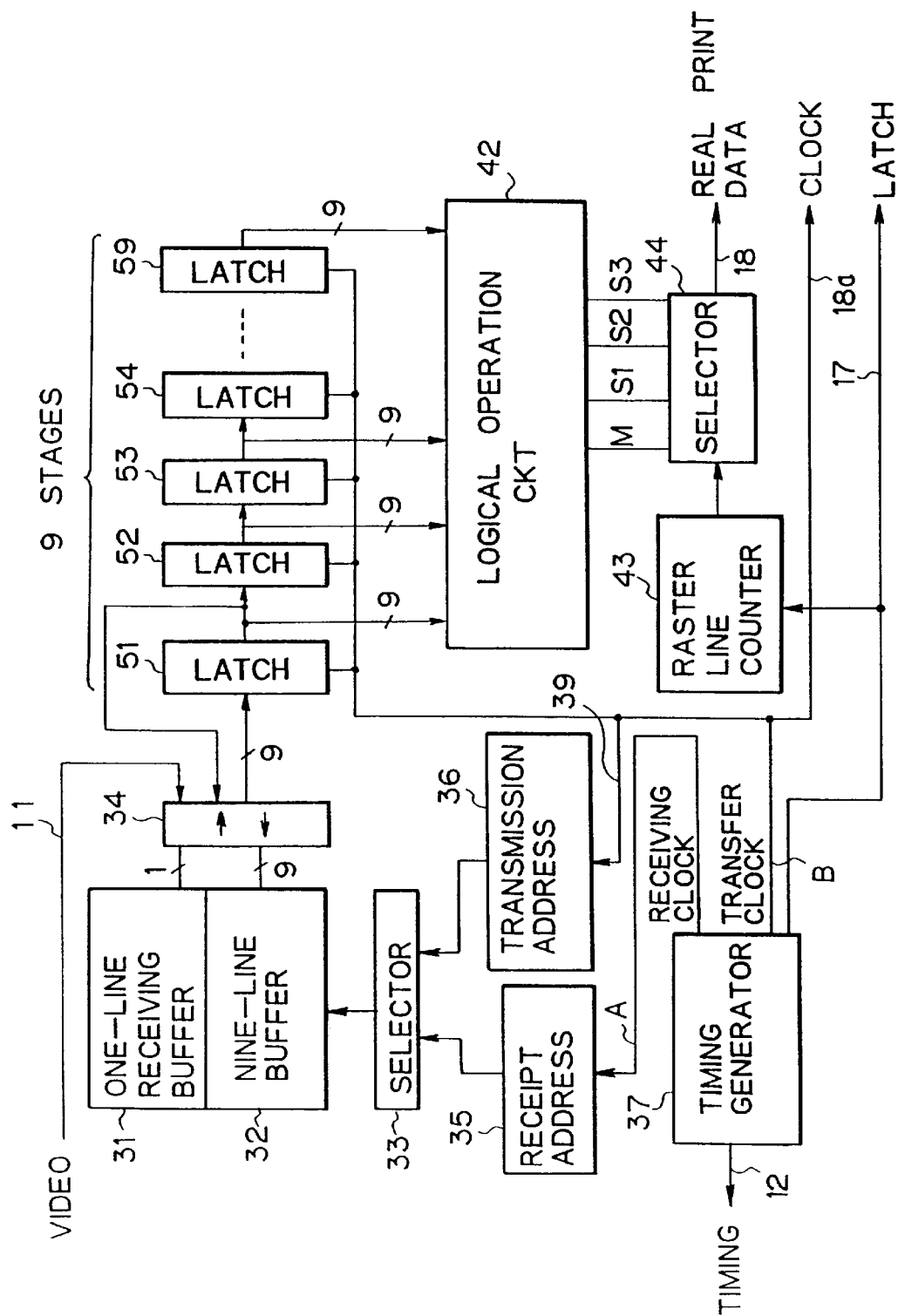
FIG. 4 is a schematic block diagram showing a print data correction circuit of a non-impact printer according to an embodiment of the present invention.
Figure 6:
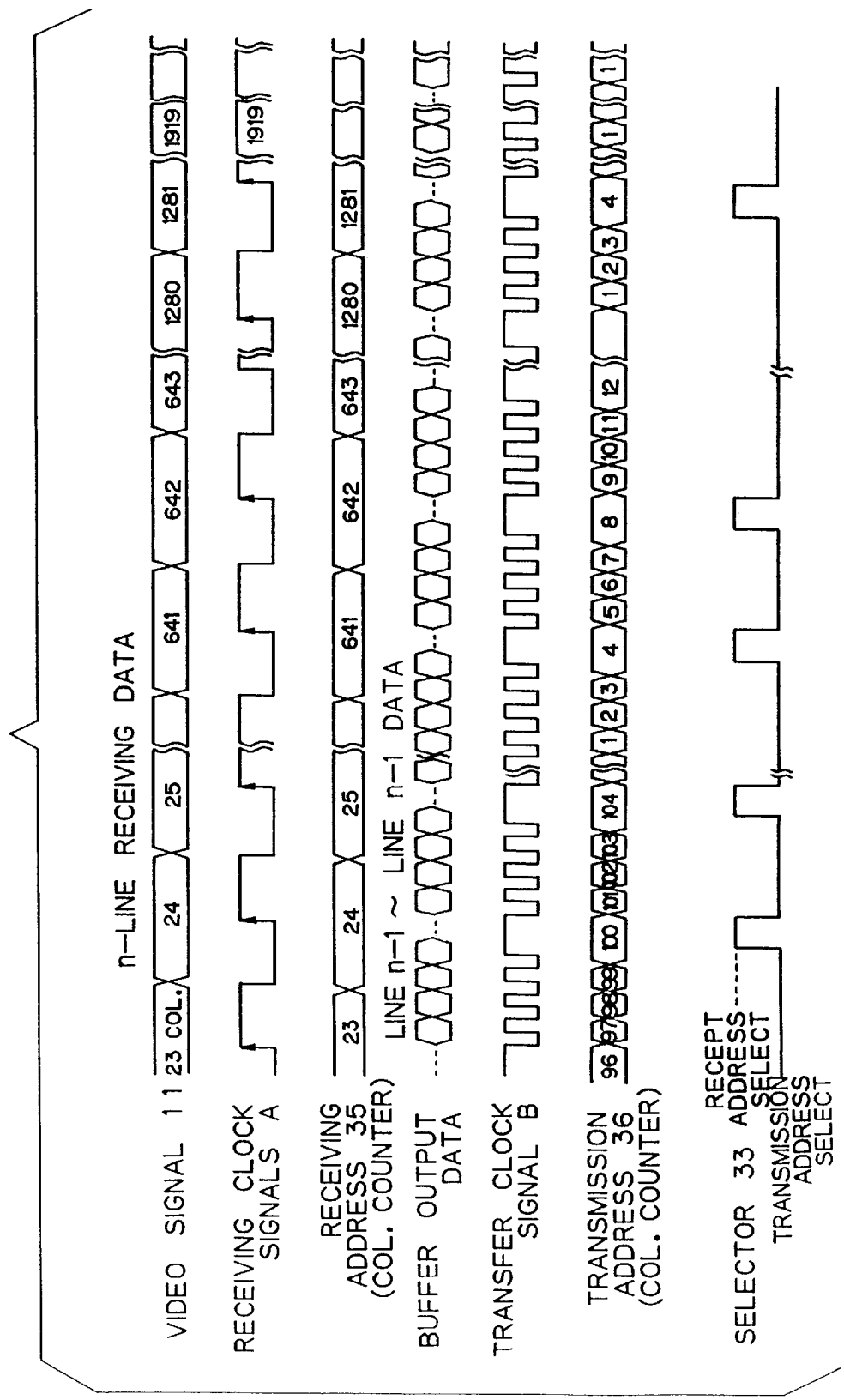
FIG. 6 is an operational time chart useful for understanding the print data correction circuit.

More in detail, referring to FIGS. 4 and 6, the video data 11 received from a host or another controller is stored in the one-line receiving buffer 31 in synchronism with a start-up of the receiving clock signal A. An address in the one-line receiving buffer 31 is indicated by the selector 33, which selects the output of the receipt address circuit 35, which is adapted to stepup in response to the trailing down edges of the receiving clock signals A. At the same time, the bilateral buffer 34 is also selected to send data the line buffer side, so that the data is stored in the one-line receiving buffer 31. This operation is repeated on each entry of data into the one-line receiving buffer 31.

On a host or another hand, in a data transmission side, data transmission processing is performed during time intervals between the occurence of the data receipt timings. In the timings of the selector 33 shown in FIG. 6, the timing indicated by the transmission address selection state represents time periods during which the data transmission processing is performed.

Now assuming that the selector 33 selects the transmission address circuit 36 side, and four kinds of data are transmitted during a time interval of occurrence of the data receipt timings, operation of the print data correction circuit 16 will be described.

The timing signal generator 37 generates, as shown in FIG. 6, transfer clock signals B which are inhibited during part of the start-up of the receiving clock signal A and which have four clock pulses during a time interval between occurences of the data receipt timings. The transmission address circuit 36 serves to sequentially step up the transmission address in the nine-line buffer 32 in response to the transfer clock signals B. As a result, nine bits of data in the addressed location, which have been stored in storage locations of the same address or "the raster direction dot position" on the continuous, nine lines of video signal stored in the nine-line buffer 32, are read out and transferred through the bilateral buffer 34 to the latch circuit 51. The transferred, nine bits of data are latched or held by the latch circuit 51 in timing of start-up of the transfer clock signal B. The transmission address circuit 36 serves to sequentially step up the transmission address in the nine-line buffer 32 in accordance with the trailing down of the transfer clock signals B. Accordingly, the corresponding, nine bits of data in the raster direction are transferred to the latch circuit 51 whenever the transfer clock signal B is applied to the transmission address circuit 36. In a similar way, the latch circuits 52–59 also latch the entered data at a timing of start-up of the transfer clock signals B. Thus, the respective, nine bits of data of outputs of the latch circuits 51–59 represent data of nine bits or columns in the continuous same raster line direction on the continuous, nine raster lines or rows.

Both the receipt address circuit 35 and the transmission address circuit 36 serve to repeatedly count the addresses corresponding to the number of dots (such as 2,560 dots) in the raster direction.

As seen from FIG. 6, prior to receipt of the subsequent video data 11 from a host or another controller, the timing signal generation circuit 37 transmits transfer clock signal B, which has a frequency that is five times as high as that of the receiving clock signal A, to the transmission address circuit 36. As a result, if the transmission address circuit 36 designates a column address in the raster direction in the nine-line buffer 32, data of the respective column on the (n−9)th row to the (n−1)th row in the nine-line buffer 32 are read out through the bilateral buffer 34 and latched by the latch circuits 51–59. The thus latched data are supplied to the logical operation circuit 42 in the form of the continuous, 9 rows×9 columns of data.

In the logical operation circuit 42, four data are obtained by logical operations using a dot matrix of the entered 9 rows×9 columns of 81 bits. These four data include correction output data M in the form of print dot data at a location which becomes a center on a basic raster line, correction output data S1 in the form of print dot data on a sub-raster line which is located at a distance of $1/1200$ inch from the basic raster line in a printing direction in which printing runs, correction output data S2 in the form of print dot data on a sub-raster line which locates at a distance of $2/1200$ inch from the basic raster line in the printing direction, and correction output data S3 in the form of print dot data on a sub-raster line which is located at a distance of $3/1200$ inch from the basic raster line in the printing direction. The above-mentioned operation is repeated until a column address counter, not shown, of the transmission address circuit 36 terminates the counting operation.

Figure 8A:
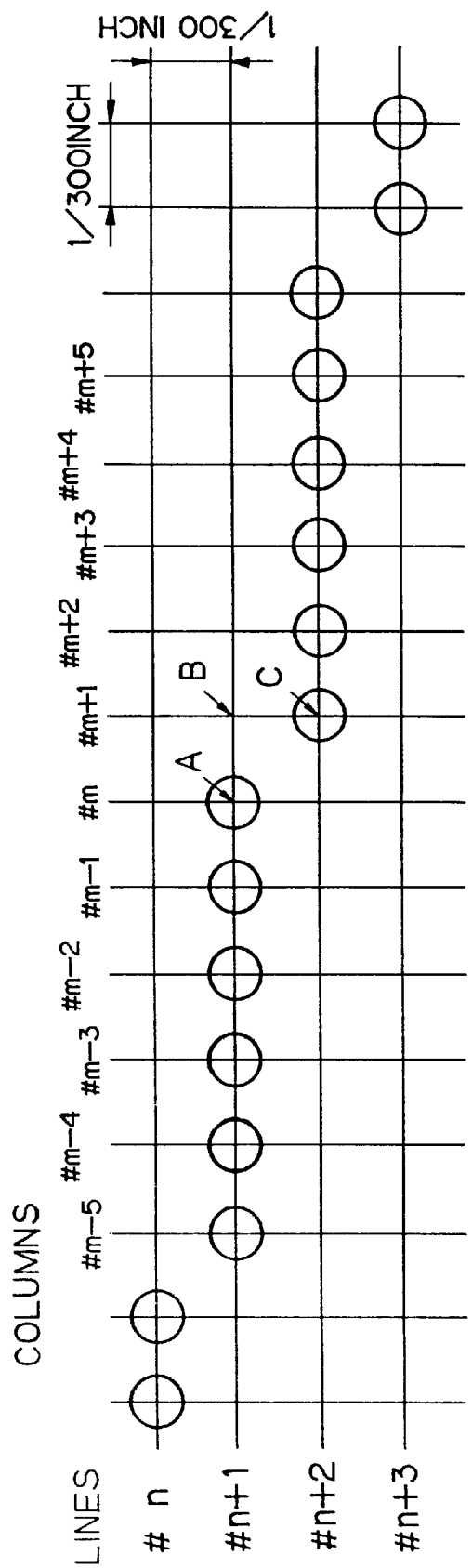
FIGS. 8A and 8B schematically show a print data conversion state in the print data correction circuit.
Figure 8B:
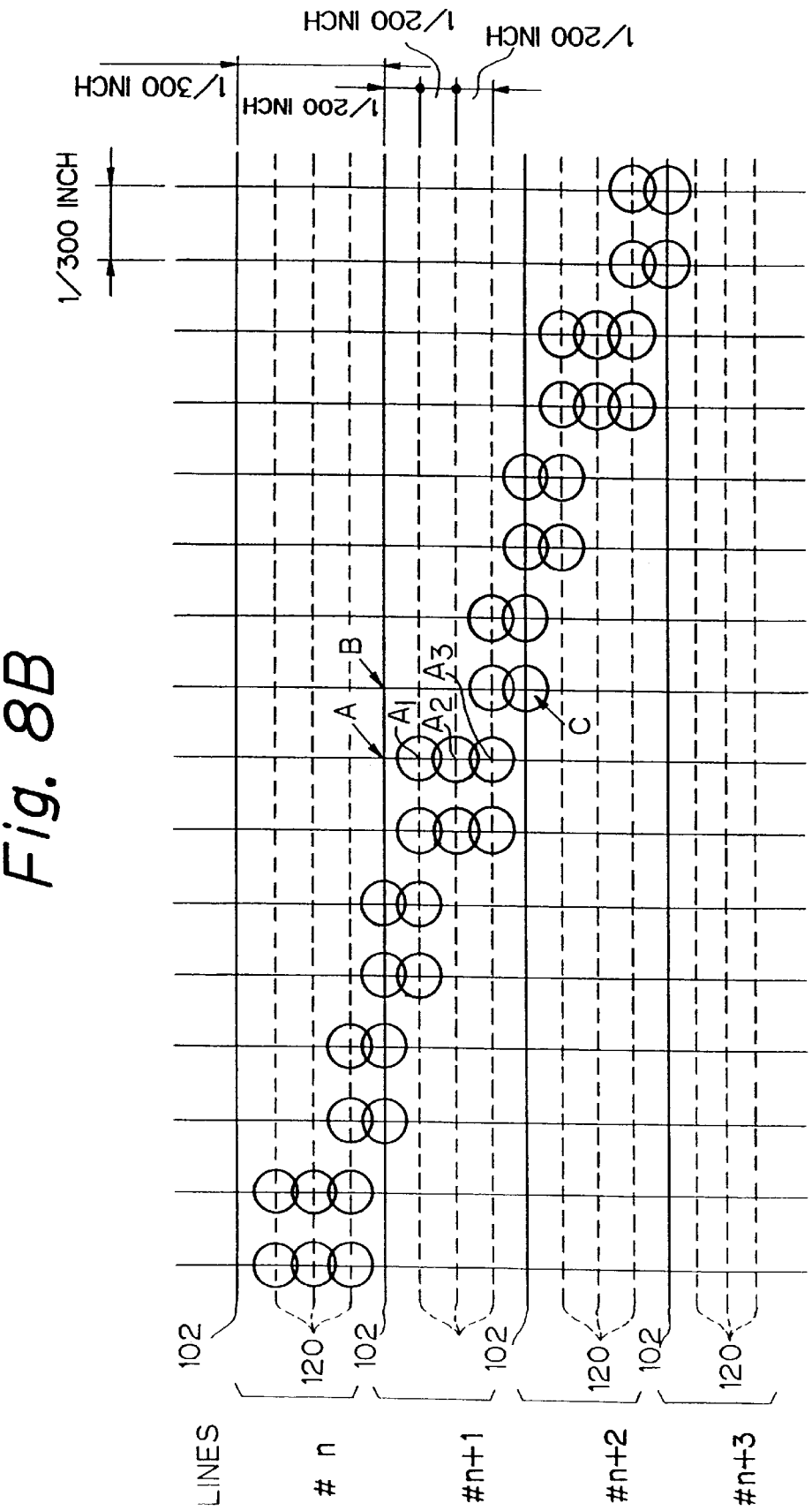
Figure 9A:
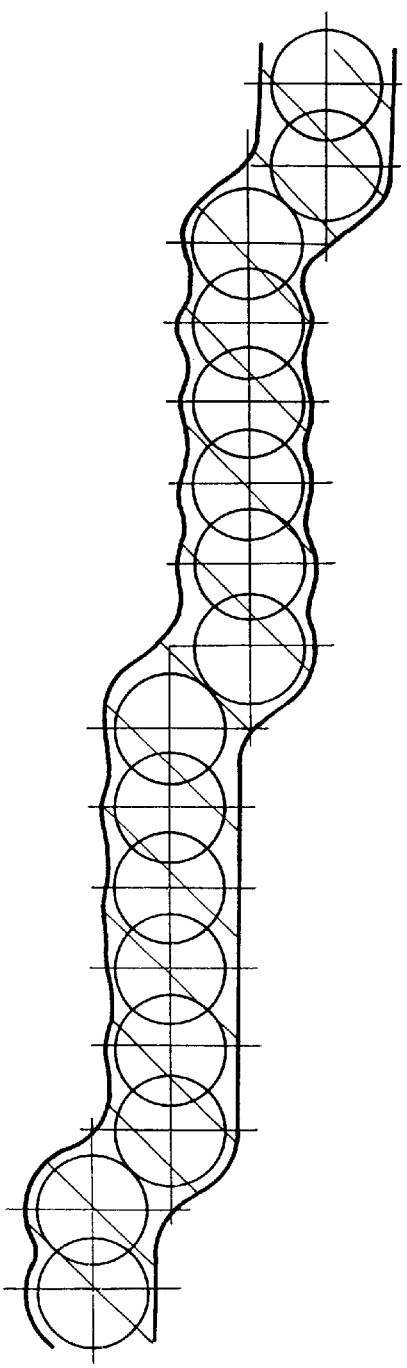
FIGS. 9A and 9B schematically show in a comparison way printing states according to the conventional non-impact printer and the printer of the present invention, respectively.
Figure 9B:
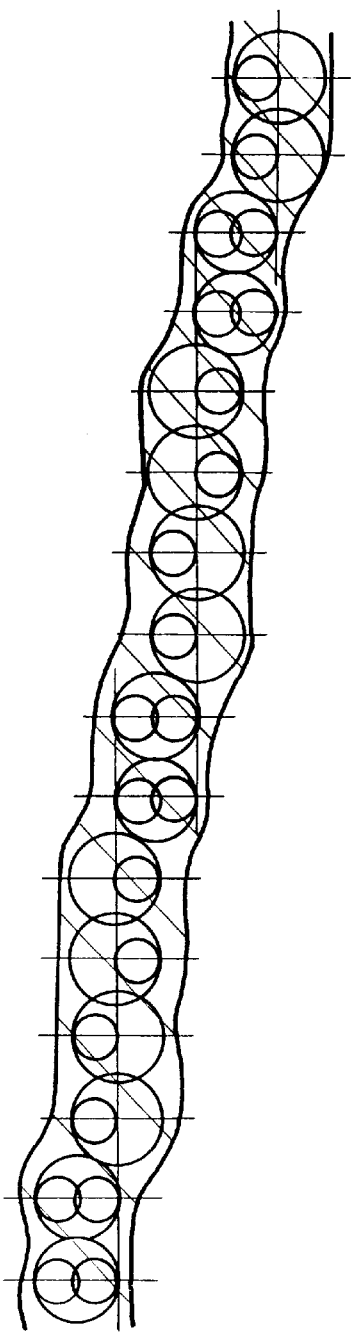

FIGS. 8A and 8B show in a comparison way dot images formed by the video data 11 and the correction output data M, S1, S2 and S3, respectively. In FIG. 8B, reference numerals 102 and 120 denote the basic raster line and the sub-raster lines, respectively.

A dot at lattice point A shown in FIG. 8A produces, in a manner which will be described later, the correction output data M, $S_1$, $S_2$ and $S_3$ for forming dots at locations $A_1$, $A_2$ and $A_3$ placed at a distance of $1/1200$ inch downwards from the position of the lattice point A in turn. In this case, the correction output data M has been deleted.

Figure 7:
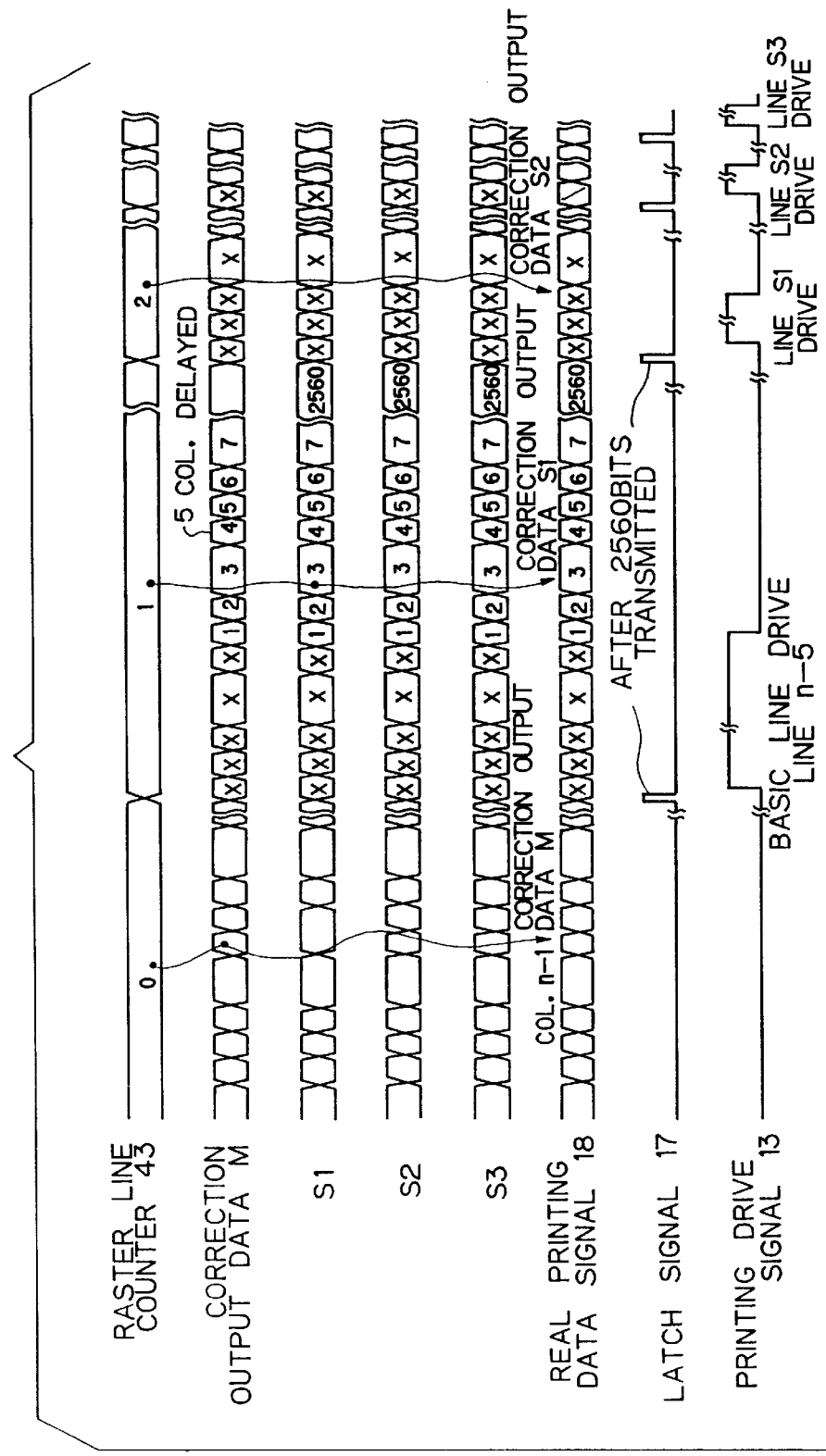
FIG. 7 is another operational time chart also useful for understanding the print data correction circuit.

As shown in FIG. 7, the correction output data M, S1, S2, and S3 are delayed by a five-column correspondence comparing with the output data from the nine-line buffer 32, since data correction is implemented on the center line of nine lines when nine lines of data are stored in the nine-line buffer 32. The real print data signal 18 to be transmitted to the LED head 19 is one selected by the selector 44 from among the correction output data M, S1, S2, and S3 by means of counting with an output of the raster line counter 43 the location of the sub-raster lines (1,200 DPI) added between the basic raster lines (300 DPI). The correction output data M, S1, S2, and S3 are sequentially transferred to the LED head 19 and then printed.

While the receipt address circuit 35 counts the number of bits, for instance, 2,560 bits in the raster direction, the transmission address circuit 36 counts four times the number of bits in the raster direction, and the logical operation circuit 42 performs the logical operation 4 times using nine lines of the same video data 11.

A printing in response to the real printing data signal 18 is performed in units of lines, including the sub-raster lines, with a 1,200 DPI pitch. The real printing data signal 18 is transferred to the LED head 19 in synchronism with the clock signal 18a. At that time, the latch signal 17 is transmitted whenever the real printing data signal 18 has transmitted the number of bits (2,560 bits) in the raster direction, so that the transmitted data signal is latched in the LED head 19. The LED head 19 is driven in response to the printing drive signal 13 with a predetermined print head drive energy for each line, that is, E1 for the basic raster line, and E2, E3 and E4 for the sub-raster lines. The print head drive energy E1, E2, E3 and E4 for the respective line is determined by operation of the logical operation circuit 42 to be optionally set by the following expressions, for instance;

$$E1 = (0.7 \text{ to } 0.8) \times E,$$

$$E2 = (0.2 \text{ to } 0.3) \times E,$$

$$E3 = (0.5 \text{ to } 0.6) \times E,$$

and $$E4 = (0.2 \text{ to } 0.3) \times E,$$

where E denotes the LED head drive energy in the conventional non-impact printer.

The printing control unit 1 includes a drive energy setting circuit S for predetermining the LED head drive energy E1 for printing on the basic raster line and the LED head drive energy E2 for printing on the sub-raster line independently of each other. A block diagram of such a drive energy setting circuit is shown by way of example in FIG. 22.

In FIG. 22, prior to the printing operation, digital values, which correspond to the LED head drive energies E1 and E2, respectively, are transmitted from a CPU or the like processor unit in the printing control unit 1 on a CPU bus to latches A 201 and B 202, respectively, and then stored therein. At the time of printing, those latched data are alternately selected by a selector 204 in accordance with an output of a toggle flip-flop 203 which is operative in response to the additional line timing signal, so as to load a decrement counter 205 in response to the additional line timing signal. The decrement counter 205 generates a pulse output during a counting period of time. This pulse output may be used as the printing drive signal 13.

Figure 10A:
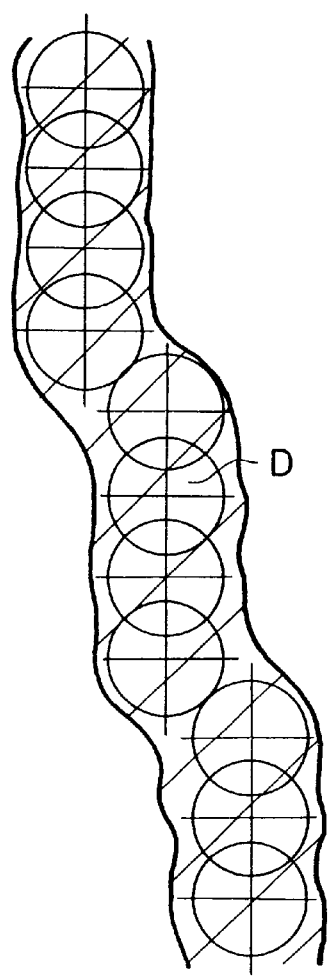
FIGS. 10A and 10B schematically show in a comparison way the printing state according to the conventional non-impact printer and another printing state according to the printer of the present invention, respectively.
Figure 10B:
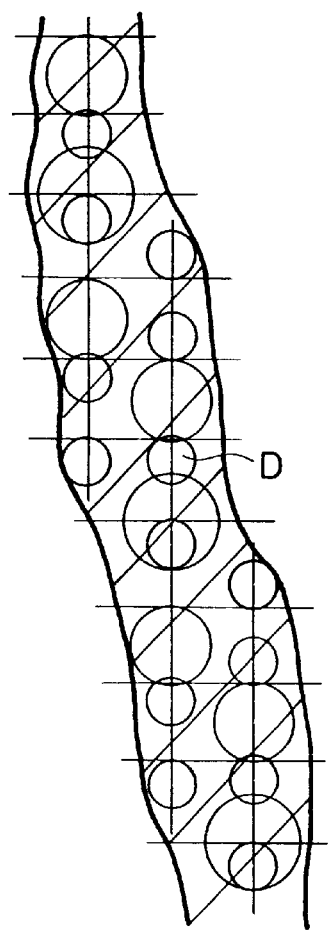
Figure 11A:
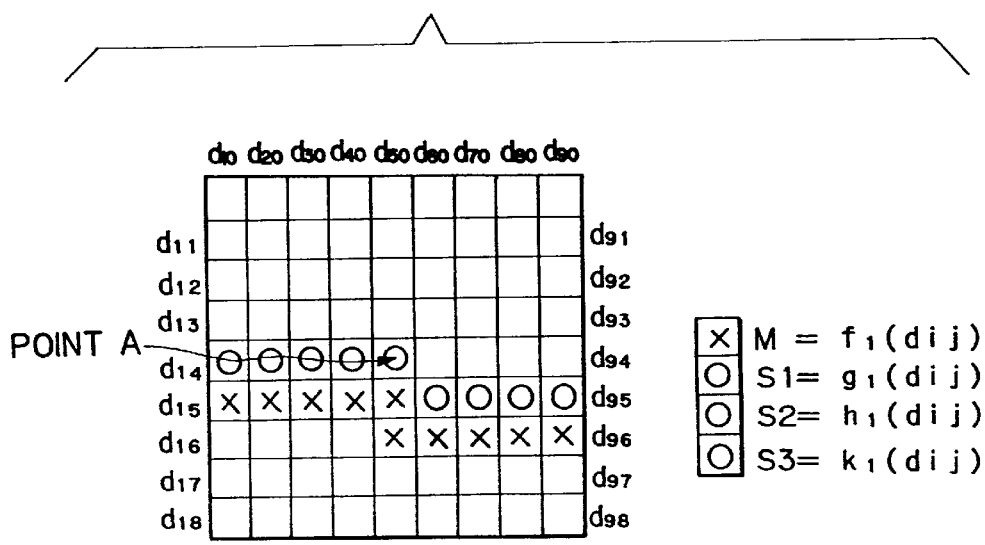
FIGS. 11A through 11D are views showing a logical operation process of a logical operation circuit of the print data correction circuit according to the embodiment.
Figure 11B:
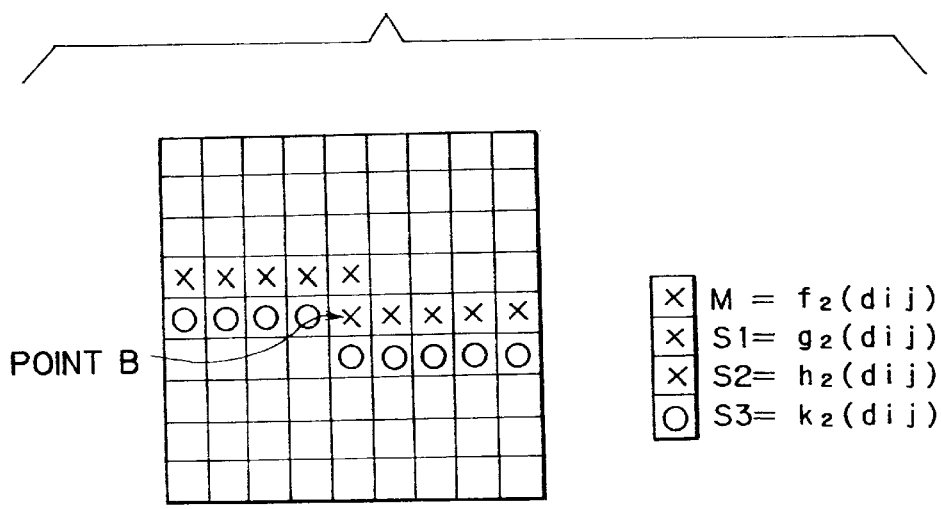
Figure 11C:
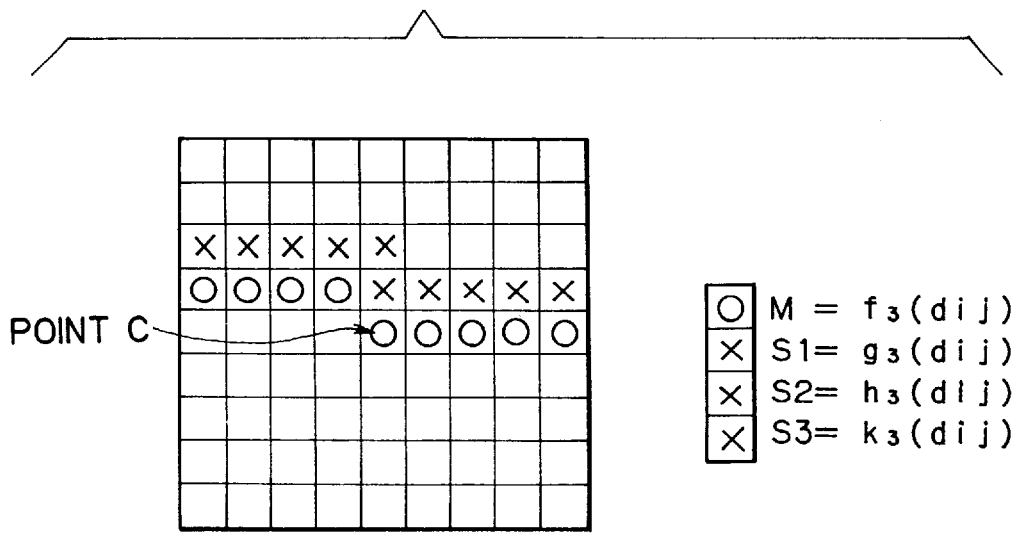
Figure 11D:
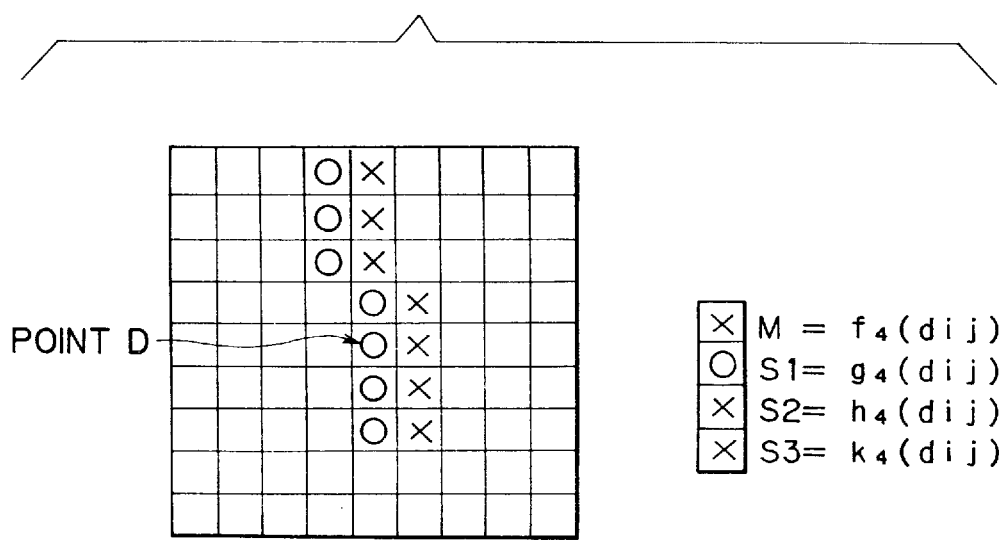

Next, referring to FIGS. 11A–11D, the operation of the logical operation circuit 42 will be described. In FIGS. 11A–11D, respective points A, B, C and D in the 300 DPI array correspond to points A, B and C shown in FIGS. 8A and 8B, and point D shown in FIGS. 10A and 10B, respectively. Circles and crosses within the dot matrix on the left denote data to be entered into the logical operation circuit 42. Four circles and crosses on the right denote the correction output data M, S1, S2, and S3, respectively.

The 9 rows×9 columns of data, which have been entered into the logical operation circuit 42, are treated as 81 pieces of data duo to dgs. The logical operation circuit 42 is provided with a function group $\{f_n(d_{ij})\}$ for operation of the correction output data M on the basic raster line, and function groups $\{g_n(d_{ij})\}$, $\{h_n(d_{ij})\}$ and $\{k_n(d_{ij})\}$ for operation of the correction output data S1, S2, and S3 on the sub-raster lines on a parallel basis, so that the the correction output data M, S1, S2, and S3 are simultaneously outputted.

The function groups, which are used in the logical operation of the point A, are exemplarily represented by $$f_1(d_{ij}) = \overline{(d_{14} \cdot d_{24} \cdot d_{34} \cdot d_{44} \cdot d_{54} \cdot d_{15} \cdot d_{25} \cdot d_{35} \cdot d_{45} \cdot d_{55} \cdot d_{65} \cdot d_{75} \cdot d_{85} \cdot d_{95} \cdot d_{56} \cdot d_{66} \cdot d_{76} \cdot d_{86} \cdot d_{96})}$$

$$g_1(d_{ij}) = \overline{(d_{14} \cdot d_{24} \cdot d_{34} \cdot d_{44} \cdot d_{54} \cdot d_{15} \cdot d_{25} \cdot d_{35} \cdot d_{45} \cdot d_{55} \cdot d_{65} \cdot d_{75} \cdot d_{85} \cdot d_{95} \cdot d_{56} \cdot d_{66} \cdot d_{76} \cdot d_{86} \cdot d_{96})}$$

-continued $$h_1(d_{ij}) = g_1(d_{ij})$$

$$k_1(d_{ij}) = g_1(d_{ij}).$$

If a result of the operation according to the equations set forth above is a binary value "1", a dot is printed, and if "0", then no dot is printed. In the actual printing, the results of the operation according to the equations correspond to the position of $d_{54}$, among the 81 pieces of data, a position located at a distance $1/1200$ inch downwards from the position of $d_{54}$, a position located at a distance $2/1200$ inch downwards from the position of $d_{54}$, and a position located at a distance $3/1200$ inch downwards from the position of $d_{54}$, respectively. For example, if the logical operation of a dot portion as to the point A is carried out, the results of the operation according to the function groups $f_n(d_{ij})$, $g_n(d_{ij})$, $h_n(d_{ij})$ and $k_n(d_{ij})$ become data representative of position information at A, $A_1$, $A_2$ and $A_3$ shown in FIG. 8, respectively. Also, as to points B–D, similar logical expressions have been prepared.

Those function groups are defined in such a manner that the correction output data S1, S2, and S3 are determined on each gradient or slope of a line represented by dots of data $d_{10}$ to $d_{98}$, and such that the respective functions may be operated on a parallel basis.

As described above, the received video data 11 of 300 DPI is converted into real printing data of 300 DPI horizontal resolution and 120 DPI vertical resolution, and then transferred to the LED head 19 to be driven.

FIGS. 9A, 9B, 10A and 10B schematically show in a comparison way printing states according to the conventional non-impact printer and the printer of the present invention. As seen from those figures, according to the present invention, it is possible to improve the printing quality in the serrated edge portion, thereby obtaining a smooth slash portion.

Next, an alternative preferred embodiment of a printer of the invention will be described with reference to the drawings in detail which include FIG. 12, a block diagram of a control circuit in a non-impact printer according to an embodiment of the present invention, and FIG. 13, a block diagram of a print data correction circuit.

Figure 12:
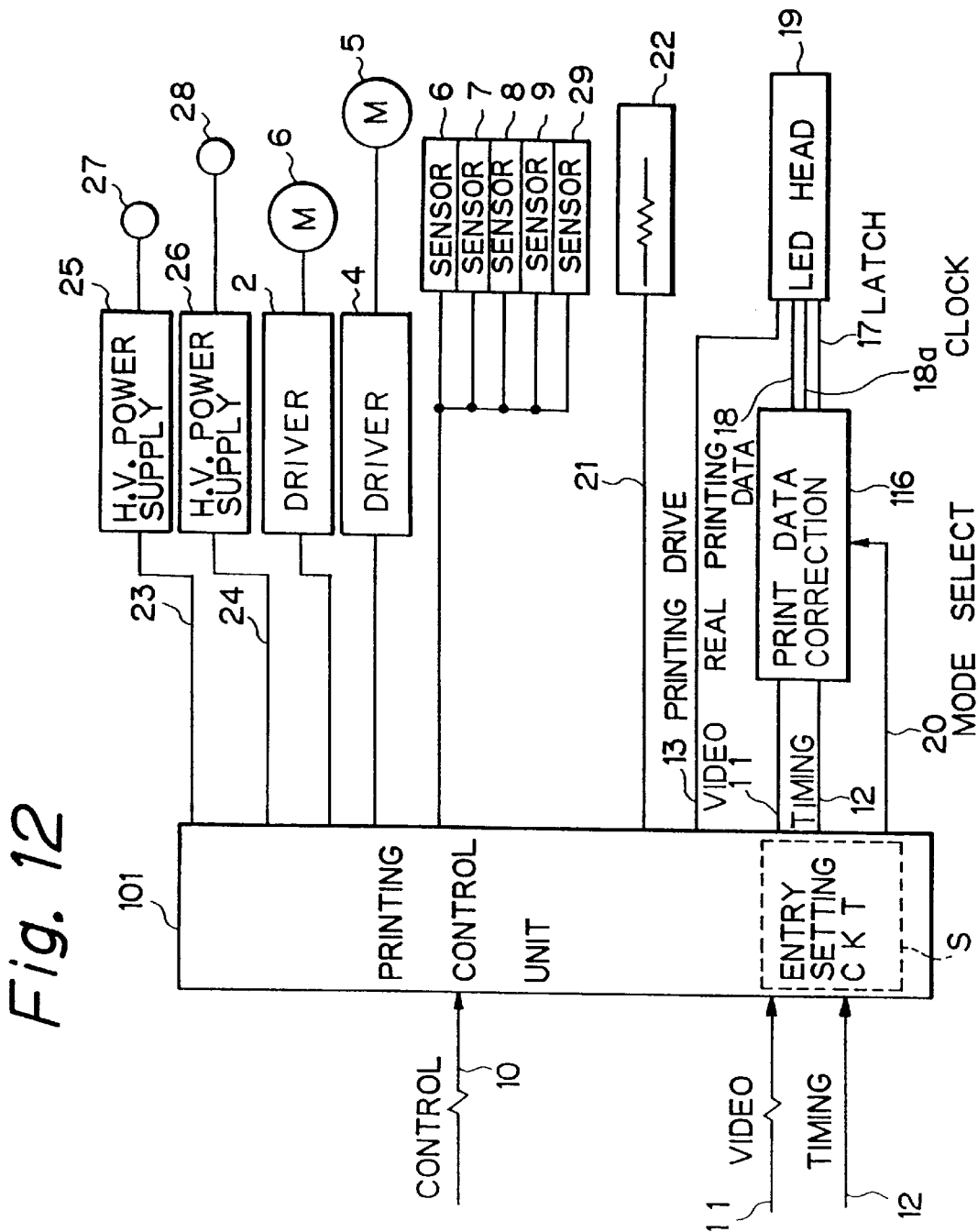
FIG. 12 is a schematic block diagram of a control circuit of a non-impact printer according to an alternative, preferred embodiment of the present invention.

In FIG. 12, the same reference numbers as those of FIG. 1 denote like components. The control circuit of a non-impact printer shown in FIG. 12 includes a print data correction circuit 116 to which a mode select signal 20 is applied from a printing control unit 101. The printing control unit 101 is adapted to generate the mode select signal 20.

Figure 13:
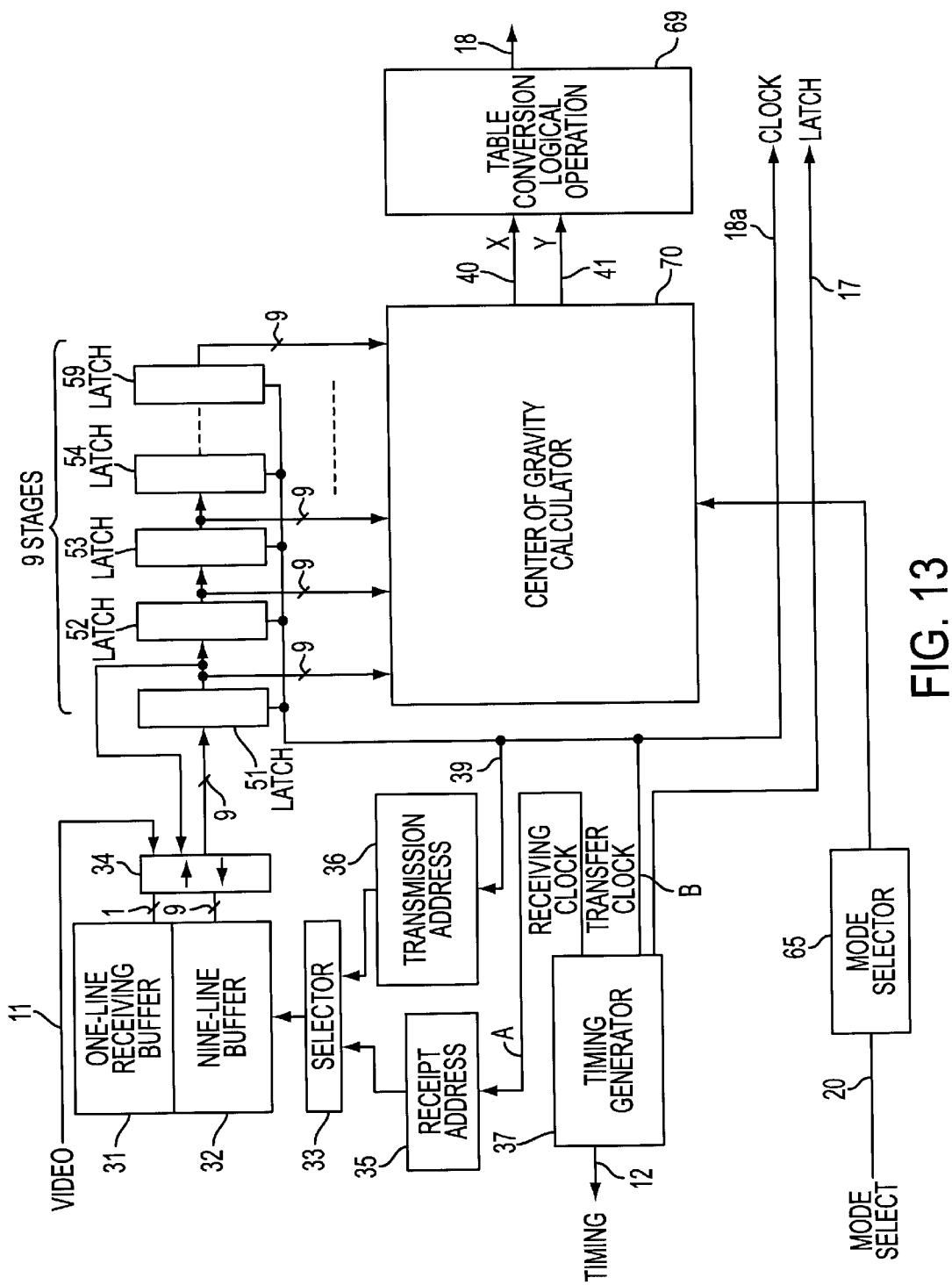
FIG. 13 is a schematic block diagram showing a print data correction circuit of a non-impact printer according to the alternative embodiment.

The print data correction circuit 116 shown specifically in FIG. 13 comprises a one-line receiving buffer 31, a nine-line buffer 32, selectors 33 and 44, a bilateral buffer 34 having a bilateral selecting function, a receipt address circuit 35, a transmission address circuit 36, a timing signal generation circuit 37, a mode selector circuit 65, a table conversion logical operation circuit 69, and a "center of gravity" calculator 70 that performs additions and multiplications.

The operation of the print data correction circuit 116 is the same as that of the print data correction circuit 16 mentioned above as far as the explanation, up to the point that the data are latched by the latch circuits 51 to 59, is concerned. Consequently, redundant description will be omitted.

Figure 14:
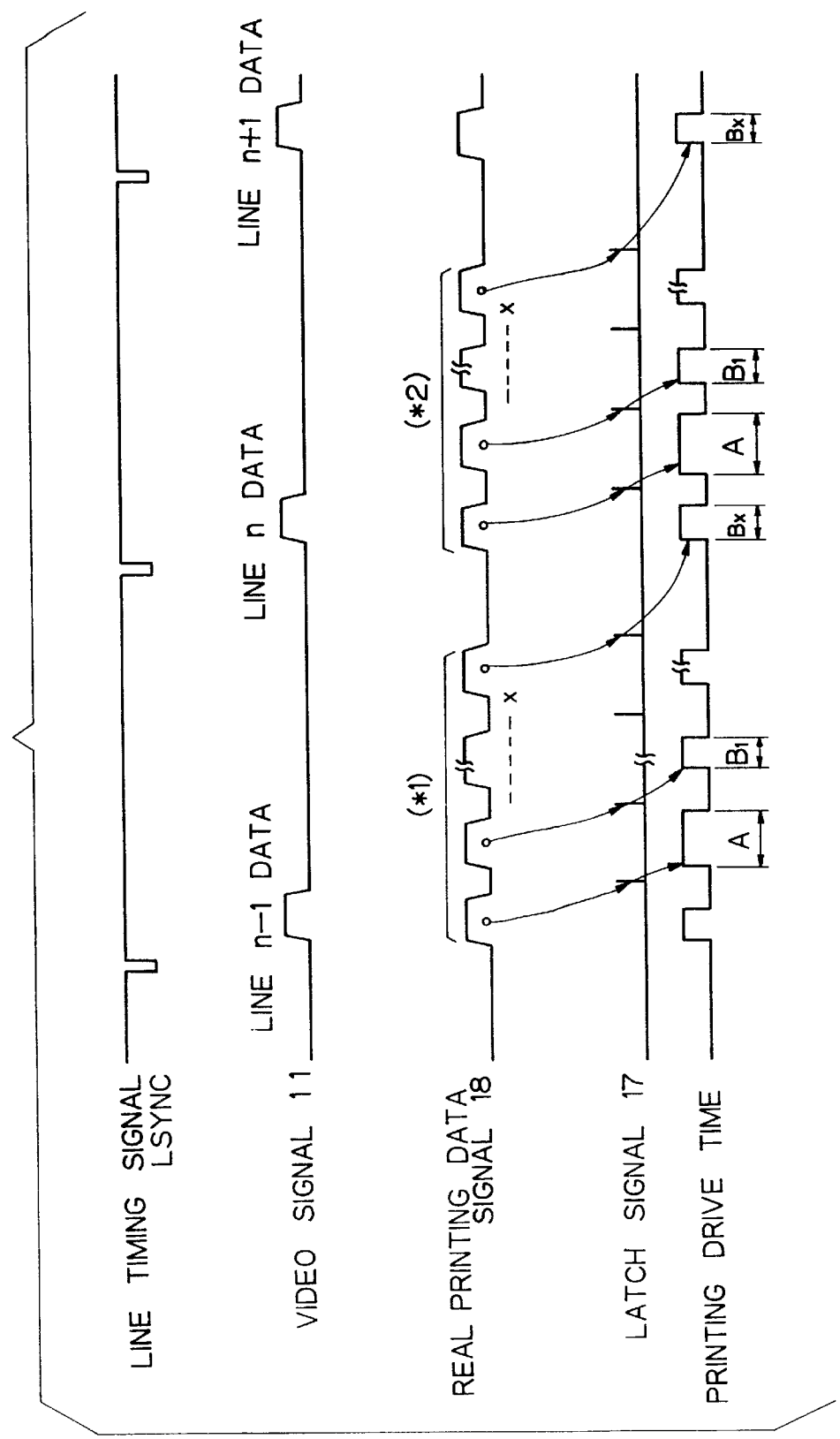
FIG. 14 is an operational time chart useful for understanding the printer unit control circuit according to the second embodiment.

FIG. 14 shows timings of the printer unit control circuit, in which N denotes the number of line buffers in the print data correction circuit 116. In the figure, *1 denotes the {n−1−(N+1)/2}th line of data obtained by a logical operation with data from the {n−N−11}th line to {n−2}th line with the number of additional sub-raster lines being x. Also,

*2 denotes the {n-(N+1)/2}th line of data obtained by a logical operation with data from the {n-N}th line to the {n-1}th line with the number of additional sub-raster lines being x. In the figure, A indicates a driving time in the case of printing of a dot on a basic raster line. B1, B2, . . . , Bx denote driving periods of time in the case of printing of a dot on respective sub-raster lines 1, 2, . . . , x.

Figure 15:
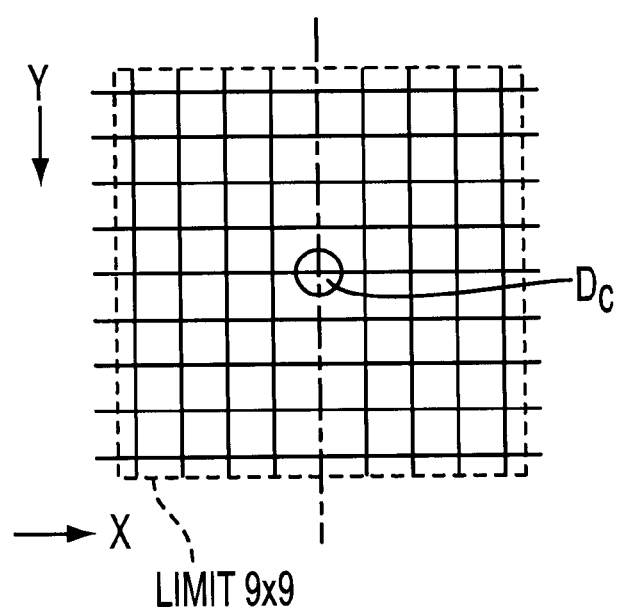
FIG. 15 schematically shows an inspection limit of a center dot to be inspected.

Referring to FIGS. 15 to 20, the operation of the center of gravity calculator 70 and the table conversion logical operation circuit 69 will be described hereinafter. As shown in FIG. 15, when a center dot on a basic raster line of interest is inspected, the location of the center of gravity of the center dot $D_c$ to be inspected is obtained by the logical operations on the basis of N×N (e.g. 9×9) pieces of data around the center dot $D_c$ to be inspected. That is, the location of the center of gravity of the center dot $D_c$ is obtained on the basis of N×N, which is 9×9 in the embodiment, pieces of data which are latched by the latch circuits 51 to 59. Any, dots around the center dot $D_c$ are divided into four blocks such as the first, second, third and fourth blocks as shown in FIGS. 16B–E, respectively. The dots which exist in an individual block, are added by in calculator 70.

Such an addition is performed individually regarding the directions X and Y. Data concerning the thus obtained location of the center of gravity for each block are subjected to logical operations in accordance with the following logical expressions so that a reference location of the center of gravity can be obtained.

$$X = A \times X_A + B \times X_B + C \times X_C + D \times X_D,$$

$$Y = A \times Y_A + B \times Y_B + C \times Y_C + D \times Y_D,$$

and $$0 \leq D < C < B < A < 1,$$

where A, B, C and D are weighted correction coefficients.

More specifically, in the calculator 70, the data concerning the obtained location of the center of gravity for each block are multiplied by a weighted correction coefficient which is predetermined for the associated block in the mode selector circuit 65, which is operative in response to the mode select signal 20 to output the weighted correction coefficients. The respective output values after multiplication are added in the calculator, thereby obtaining the coordinate (X, Y) of the location of the center of gravity as a basis of the correction.

Figure 17:
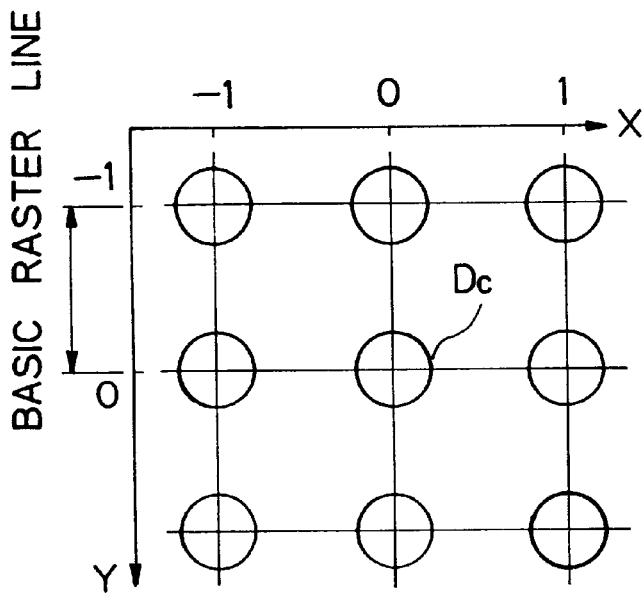
FIG. 17 schematically shows coordinate of the inspection limit of the center dot to be inspected.
Figure 18:
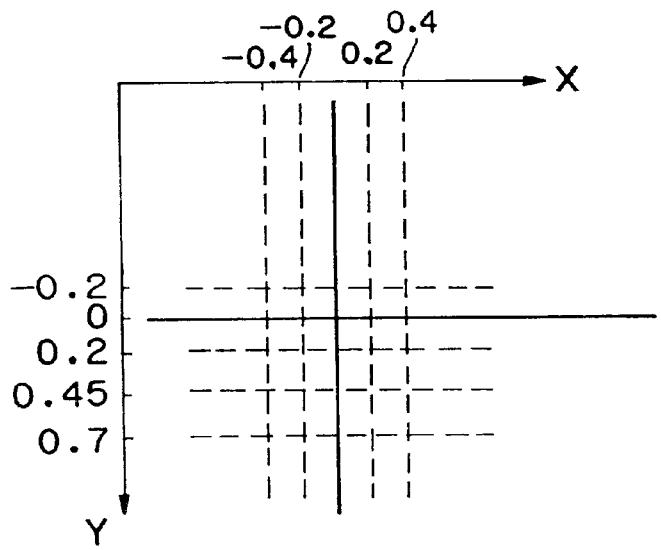
FIG. 18 schematically shows coordinate of location of the center of gravity.

In the table conversion logical operation circuit 69, the coordinate (X, Y) of the location of the center of gravity as shown in FIG. 18 is obtained on the basis of a coordinate system as shown in FIG. 17, and the obtained coordinate (X, Y) is converted on the basis of tables as shown in FIGS. 19 and 20 into the output patterns.

As mentioned above, the coordinate (X, Y) of the location of the center of gravity is converted into the output pattern comprising dots including a dot, as the center dot, on the basic raster line, and dots on a plurality of sub-raster lines provided between the basic raster lines, and the thus converted output data are transmitted in the respective printing timings, that is, the basic raster timing and the additional raster timing, to the LED head 19 in the form of real printing data signal 18 together with the clock signal 18a. Thus, printed on the basic raster lines and the sub-raster lines are dots based on the output patterns.

The LED head driving time on the sub-raster lines may be predetermined on each line in the printing control unit 101. According to the present embodiment, there are provided three sub-raster lines between the basic raster lines, and the LED head driving time for a dot on each of the sub-raster lines is less than that for a dot on the basic raster line. In this case, the LED head driving time may be optionally determined depending on the disposition of dots in the output pattern after conversion.

The printing control unit 101 includes a drive energy setting circuit S for predetermining the LED head drive energy E1 for printing on the basic raster line and the LED head drive energy E2 for printing on the sub-raster line independently of each other. A block diagram of such a drive energy setting circuit is shown by way of example in FIG. 22, as described earlier.

In FIG. 22, prior to the printing operation, digital values, which correspond to the LED head drive energies E1 and E2, respectively, are transmitted from the processor such as a CPU in the printing control unit 1 over the CPU bus to the latches A 201 and B 202, respectively, and then stored therein. At the time of printing, the latched data are alternately selected by the selector 204 in response to the output from the toggle flip-flop 203 which is operative in response to the additional line timing signal, so as to load the decrement counter 205 in response to the additional line timing signal. The decrement counter 205 generates a pulse output during a counting period of time. This pulse output may be used as the printing drive signal 13.

In a case where no data exists in the center dot, or a case where no dot exists in the nearest position on the coordinate, it is possible to omit the processing by the print data correction circuit 116.

Figures 21A, 21B, 21C:
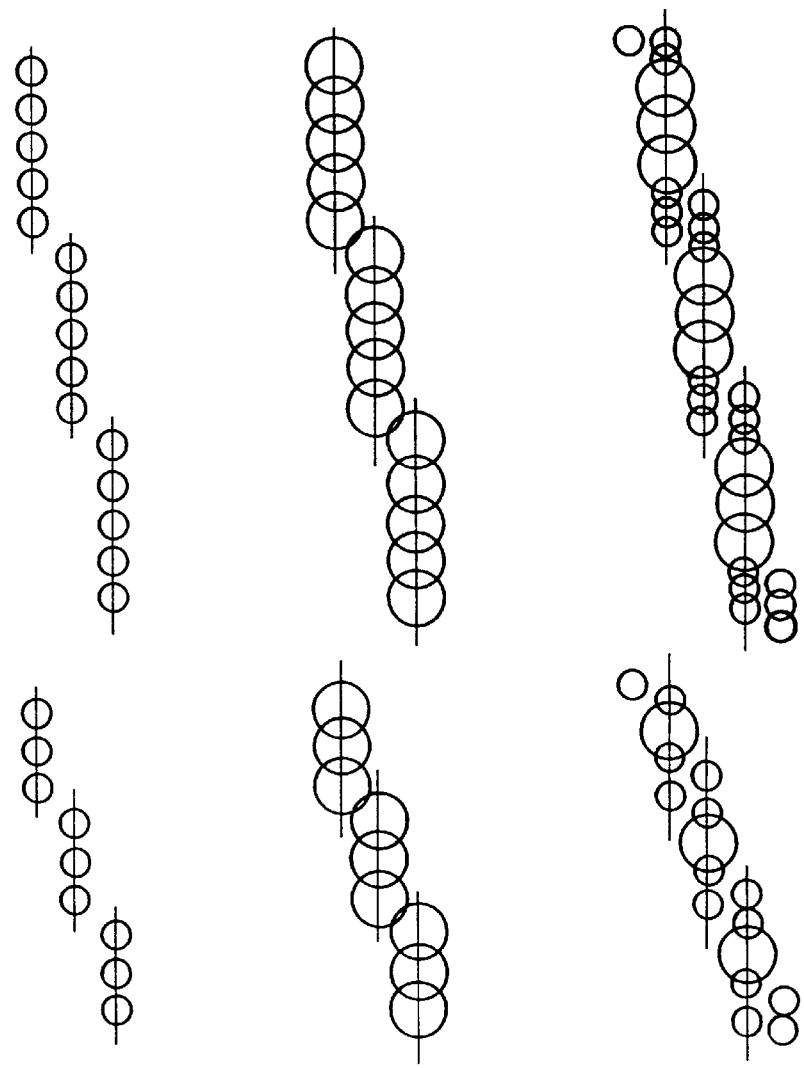
FIGS. 21A, 21B and 21C schematically show in a comparison way printing states according to the conventional non-impact printer and the printer of the present invention.

FIGS. 21A, 21B and 21C schematically show in a comparison way printing states according to the conventional non-impact printer and the printer of the present invention. FIG. 21A shows a dot pattern by the video data 11, FIG. 21B does a dot pattern printed according to the conventional printer, and FIG. 21C a dot pattern printed according to the printer of the present invention.

As seen from FIG. 21C, according to the present invention, it is possible to improve the printing quality in the serrated edge portion, thereby obtaining a smooth slash portion.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What we claim is:

1. A printer responsive to control signals and video datas received from an external host controller, the video datas providing video data for printing on basic raster lines, the video data having a first resolution, said printer comprising:

a printing control unit for receiving the control signals and the video datas from the host controller and providing sequence control for the printer in response to the control signals and the video datas, the printing control unit additionally generating printing drive signals and transmitting the video data of the video datas;

print data correction circuit means, responsive to the video data transmitted by the printing control unit, for producing real printing data having a second resolution, the second resolution being different from the first resolution, so that there is a difference between the first resolution and the second resolution; and a print head which receives the real printing data and the printing drive signals, wherein said print data correction circuit means includes timing signals generating means for generating basic line timing signals for printing on the basic raster lines, and additional line timing signals between the basic line timing signals, a predetermined number of additional line timing signals being generated between adjacent basic line timing signals, the number of additional line timing signals between adjacent basic line timing signals being a function of the difference between the first resolution and the second resolution, buffer means for storing the video data, means for deriving a predetermined number of lines of video data and a predetermined number of columns of video data from among the video data stored in said buffer means, means for receiving the lines and columns of video data and generating center of gravity location information by performing logical operations to locate a center of gravity of video data representing dots peripheral to a central dot of the lines and columns of video data, a conversion circuit which converters the center of gravity location information generated by the logical operations of the means for generating into corresponding output patterns, and means for transmitting the output patterns to the print head as the real printing data in synchronism with the basic line timing signals for printing on the basic raster lines and the additional line timing signals for printing on sub-raster lines.

2. A printer according to claim 1, wherein the conversion circuit comprises means for producing the output patterns through a conversion of the center of gravity location information using a table.

3. A printer according to claim 1, wherein the logical operations to locate a center of gravity of video data representing dots peripheral to a central dot are such that a predetermined coefficient is multiplied for each peripheral dot in an n×n matrix having a center, where n is an odd number not less than 3 and the central dot is in the center of the matrix, and wherein the center of gravity location information is evaluated through a sum of individual values thus multiplied.

4. A printer according to claim 3, wherein the logical operations to locate a center of gravity of video data representing dots peripheral to a central dot are performed in such a manner that dots existing in each of a plurality of blocks as set forth below:

a first neighborhood comprising dots on a 3×3 square with the central dot in the center, a second neighborhood comprising dots on a 5×5 square with the central dot in the center, a third neighborhood comprising dots on a 7×7 square with the central dot in the center, and a fourth neighborhood comprising dots on a 9×9 square with the central dot in the center, are added to one another for each block, an addition value thus obtained is multiplied by a predetermined coefficient for each block, and a sum of values each obtained through a multiplication on an associated block is calculated.

5. A printer according to claim 4, wherein the coefficients satisfy the following condition:

$0 \leq$ the coefficient to be multiplied for a block of the fourth neighborhood<the coefficient to be multiplied for a block of the third neighborhood<the coefficient to be multiplied for a block of the second neighborhood<the coefficient to be multiplied for a block of the first neighborhood<1.

6. A printer according to claim 4, wherein the logical operations to locate a center of gravity of video data representing dots peripheral to a central dot are performed in such a manner that dots existing in each of a plurality of blocks as set forth below:

a first neighborhood comprising dots on a 3×3 square with the central dot in the center;

a second neighborhood comprising dots on a 5×5 square with the central dot in the center;

a third neighborhood comprising dots on a 7×7 square with the central dot in the center; and a fourth neighborhood comprising dots on a 9×9 square with the central dot in the center, are added to one another for each block, an addition value thus obtained is multiplied by a predetermined coefficient for each block, and a sum of values each obtained through a multiplication on an associated block is calculated.

7. A printer according to claim 6, wherein the coefficients satisfy the following condition:

$0 \leq$ the coefficient to be multiplied for a block of the fourth neighborhood<the coefficient to be multiplied for a block of the third neighborhood<the coefficient to be multiplied for a block of the second neighborhood<the coefficient to be multiplied for a block of the first neighborhood<1.

8. A printer according to claim 1, wherein said buffer means stores a predetermined number of lines of video data in units of lines, and said timing signals generating means has means for generating a timing signal for causing said printing control unit to generate video data and a receiving timing signal for causing said buffer means to store therein the video data from said printing control unit.

9. A printer according to claim 8, wherein said buffer means has m line buffers, one of said line buffers sequentially storing video data entered, and remaining ones of said line buffers storing, after a completion of video data inputting into said one line buffer, the video data stored in said one line buffer on a shift basis for each line, and said means for deriving and for performing has a latch circuit for storing video data of n-lines×n-columns in said m line buffers.

10. A printer responsive to control signals and video datas received from an external host controller, the video datas providing video data for printing on basic raster lines, the video data having a first resolution, said printer comprising:

a printing control unit for receiving the control signals and the video datas from the host controller and providing sequence control for the printer in response to the control signals and the video datas, the printing control unit additionally generating printing drive signals and transmitting the video data of the video datas;

print data correction circuit means, responsive to the video data transmitted by the printing control unit, for producing real printing data having a second resolution, the second resolution being different from the first resolution, so that there is a difference between the first resolution and the second resolution; and a print head which receives the real printing data and the printing drive signals, wherein said print data correction circuit means includes timing signals generating means for generating basic line timing signals for printing on the basic raster lines, and additional line timing signals between the basic line timing signals, a predetermined number of additional line timing signals being generated between adjacent basic line timing signals, the number of additional line timing signals between adjacent basic line timing signals being a function of the difference between the first resolution and the second resolution, line buffer means for storing a predetermined number of lines of video data in units of lines, means for deriving a predetermined number of lines of video data and a predetermined number of columns of video data from among the video data stored in said line buffer means, means for receiving the lines and columns of video data and generating center of gravity location information by performing logical operations to locate a center of gravity of video data representing dots peripheral to a central dot of the lines and columns of video data a conversion circuit which converts the center of gravity location information generated by the logical operations of the means for generating into corresponding output patterns, and means for transmitting the output patterns to the print head as the real printing data in synchronism with the basic line timing signals for printing on the basic raster lines and the additional line timing signals for printing on sub-raster lines, and wherein said printing control unit has a means for setting up independently of one another a first drive energy for printing on the basic raster lines and a second drive energy for printing on the sub-raster lines, and produces the printing drive signals on the basis of said setting up means.

11. A printer according to claim 10, wherein setting up of the first drive energy and the second drive energy by said printing control unit is carried out for each line of the basic raster lines and the sub-raster lines.

12. A printer according to claim 10, wherein setting up of the first drive energy and the second drive energy by said printing control unit is carried out for each line of the basic raster lines and the sub-raster lines through one setting.

13. A printer according to claim 10, wherein said printing control unit sets up the first drive energy and the second drive energy via multiplications by mutually different predetermined constants, respectively.

14. A printer according to claim 13, wherein the constants for the multiplications are 1 or less than 1.

15. A printer according to claim 10, wherein the conversion circuit comprises means for producing the output patterns through a conversion of the center of gravity location information using a table.

16. A printer according to claim 10, wherein the logical operations to locate a center of gravity of video data representing dots peripheral to a central dot are such that a predetermined coefficient is multiplied for each peripheral dot in an n×n matrix having a center, where n is an odd number not less than 3 and the central dot is in the center of the matrix, and wherein the center of gravity location information is evaluated through a sum of individual values thus multiplied.

17. A printer according to claim 10, wherein said buffer means stores a predetermined number of lines of video data in units of lines, and said timing signals generating means has means for generating a timing signal for causing said printing control unit to generate video data and a receiving timing signal for causing said buffer means to store therein the video data from said printing control unit.

18. A printer according to claim 17, wherein said buffer means has m line buffers, one of said line buffers sequentially storing video data entered, and remaining ones of said line buffers storing, after a completion of video data inputting into said one line buffer, the video data stored in said one line buffer on a shift basis for each line, and said means for deriving and performing has a latch circuit for storing video data of n-lines×n-columns in said m line buffers.

* * * * *